United States Patent [19]

Nilsen

[11] Patent Number: 5,687,368
[45] Date of Patent: Nov. 11, 1997

[54] CPU-CONTROLLED GARBAGE-COLLECTING MEMORY MODULE

[75] Inventor: Kelvin D. Nilsen, Ames, Iowa

[73] Assignee: Iowa State University Research Foundation, Inc., Ames, Iowa

[21] Appl. No.: 279,632

[22] Filed: Jul. 22, 1994

[51] Int. Cl.⁶ ................................................ G06F 17/30
[52] U.S. Cl. .............................. 395/614; 395/622
[58] Field of Search .......................... 395/600, 614, 395/622; 364/DIG. 1, DIG. 2

[56] References Cited

U.S. PATENT DOCUMENTS

| | | | |
|---|---|---|---|
| 4,775,932 | 10/1988 | Oxley et al. ............... | 395/600 |
| 4,797,810 | 1/1989 | McEntee et al. ........... | 395/600 |
| 4,807,120 | 2/1989 | Courts ......................... | 395/600 |
| 4,907,151 | 3/1990 | Bartlett ....................... | 395/600 |
| 4,912,629 | 3/1990 | Shuller, Jr. ................. | 395/600 |
| 4,989,134 | 1/1991 | Shaw ........................... | 395/600 |
| 5,136,706 | 8/1992 | Courts ......................... | 395/600 |
| 5,218,698 | 6/1993 | Mandl ......................... | 395/650 |
| 5,355,483 | 10/1994 | Serlet ........................... | 395/650 |
| 5,392,432 | 2/1995 | Engelstad et al. .......... | 395/700 |
| 5,560,003 | 9/1996 | Nilsen et al. ................ | 395/600 |

*Primary Examiner*—Thomas G. Black
*Assistant Examiner*—Maria Von Buhr
*Attorney, Agent, or Firm*—Robert E. Malm

[57] ABSTRACT

The CPU-controlled garbage-collecting memory module (CPU-C GCMM) is essentially an intelligent memory that connects to a central processing unit (CPU) and performs the routine and repetitive tasks associated with a spectrum of garbage-collecting techniques under the direction and control of the CPU. The CPU-C GCMM performs its garbage-collecting tasks as background tasks to be performed when the CPU-C GCMM is not burdened with the ordinary fetch and store operations necessitated by the application programs being run on the CPU. The CPU-C GCMM can be structured in a variety of ways. One species which embodies the essence of the invention includes a memory and a memory controller which provides the means for reading data from and writing data to the memory. The memory controller receives fetch requests directly from the CPU and returns the requested data immediately even though the data may be incorrect in certain instances. A microcontroller which exercises overall control over the component parts of the CPU-C GCMM together with a fetch monitor work together to repair any incorrect data deliveries to the CPU by the memory controller. A communication-channels unit provides the means of communication between the CPU and the microcontroller for handling all interactions between the CPU and the CPU-C GCMM except fetch requests. An object space manager unit provides a means for rapidly identifying the header of an object given a pointer to the interior of an object.

98 Claims, 9 Drawing Sheets

```
Read-From-Memory (address) {
  if (address lies between Relocated and Reserved) {
    find the header location of the referenced object
    follow the backwarding pointer into from-space
    fetch the requested data out of from-space
  }
  else
    fetch the requested data out of to-space if the fetched data is a pointer to from-space {
    find the header of the from-space object
    if the header indicates the object has already been
        reserved for copying into to-space
      adjust the pointer's value
    else {
      reserve space for the object within the copy-queue
      insert the new object into the OSM data base
      copy the header to to-space
      place a backwarding pointer in to-space
      overwrite the from-space header with a forwarding
        pointer
    }
  }
}
```

FIG. 7

```
Write-To-Memory (address, data) {
  if (address lies between Relocated and Reserved) {
    find the header location of the referenced object
    follow the backwarding pointer into from-space
    write the data into from-space
  }
  else
    write the data into to-space
}
```

FIG. 8

```
Read-From-Memory (address) {
    fetch the requested data and return it
    if the data is a pointer {
        find the header location of the referenced object
        if the link field equals NULL
            link this object onto the list of objects to be scanned
    }
}
```

```
Read-From-Memory (address) {
  if (address lies between Relocated and Reserved) {
    find the header location of the referenced object
    follow the backwarding pointer into from-space
    fetch the requested data out of from-space
  }
  else
    fetch the requested data from the specified address if the fetched data is a pointer to from-space {
    find the header of the from-space object
    if the header indicates the object has already been
        reserved for copying into to-space
      adjust the pointer's value
    else {
      reserve space for the object within the copy-queue
      insert the new object into the OSM data base
      copy the header to to-space
      place a backwarding pointer in to-space
      overwrite the from-space header with a forwarding
        pointer
    }
  }
  else if the data is a pointer that does not refer to to-space {
    find the header location of the referenced object
    if the link field equals NULL
      link this object onto the list of objects to be scanned
  }
}
```

```
Read-From-Memory(address) {
  if (address lies between Relocated and Reserved) {
    find the header location of the referenced object
    follow the backwarding pointer into from-space
    fetch the requested data out of from-space
  }
  else if (address lies between MSRelocated and MSReserved) {
    find the header location of the referenced object
    follow the backwarding pointer into from-space
    fetch the requested data out of from-space
  }
  else
    fetch the requested data from the specified address if the fetched data is a pointer to from-space {
    find the header of the from-space object
    if the header indicates the object has already been
        reserved for copying into to-space
      adjust the pointer's value
    else {
```

```
if (this object's age indicates that it is
    ready for promotion, and there is adequate contiguous
    space in the mark-and-sweep region to represent a copy
    of this object) {
  reserve space for the object within the mark-and-sweep copy-queue
  insert the new object into the OSM data base
  copy the header to the mark-and-sweep region
  place a backwarding pointer in the mark-and-sweep region
  overwrite the from-space header with a forwarding
      pointer
}
else {
  reserve space for the object within the copy-queue
  increment the object's age
  insert the new object into the OSM data base
  copy the header to to-space
  place a backwarding pointer in to-space
  overwrite the from-space header with a forwarding
      pointer
}
```

```
Write-To-Memory(address, data) {
    if (address lies between Relocated and Reserved) {
        find the header location of the referenced object
        follow the backwarding pointer into from-space
        write the data into from-space
    }
    else if (address lies between MSRelocated and MSReserved ) {
        find the header location of the referenced object
        follow the backwarding pointer into from-space
        write the data into from-space
    }
    else
        write the data to the specified address if (address lies within the mark-and-sweep region, and
        the word at address is tagged as a pointer, and
        data points into the nursery)
        add address into the cross-generational log
}
```

CPU-CONTROLLED GARBAGE-COLLECTING MEMORY MODULE

The U.S. Government has a paid-up license in this invention and the right in limited circumstances to require the patent owner to license others on reasonable terms as provided for by the terms of Grant ITA 87-02 awarded by the Department of Commerce.

BACKGROUND OF INVENTION

This invention relates generally to computer systems and more specifically to the memory portions of such systems. The subject matter of this invention is related to the subject matter of the prior inventions entitled GARBAGE-COLLECTING MEMORY MODULE, Ser. No. 07/994,517, filed Dec. 21, 1992 (now U.S. Pat. No. 5,560,003, issued Sep. 24, 1996) and OBJECT SPACE MANAGER CIRCUIT, Ser. No. 08/176,940, filed Jan. 4, 1994, (pending).

One of the major trends in computer science of the last decade has been the increasing popularity of the "object-oriented" paradigm. While there is little consensus regarding the meaning of this term, any object-oriented system must be concerned with the allocation and maintenance of storage for "objects" where an "object" is a collection of data that share a particular attribute and occupy a contiguous region of memory. Objects are not permitted to overlap. "Live" objects are those needed in the computational process currently being performed by a computer system.

If all objects in a system are permanent, then there is no concern about memory management. The space assigned to each object at system startup need never be reclaimed. In most real systems, however, live objects have varying lifetimes that cannot be predicted in advance. In such systems, some method of recognizing expired ("dead") objects and evicting them from memory is necessary if memory resources are to be conserved.

"Garbage" is a term of art in computer technology which refers to data stored in computer system memory that is no longer being used in the performance of an application program. Garbage collection is the process of locating data in dynamically-allocated memory that is no longer being used and reclaiming the memory to satisfy future allocation requests. Since garbage collection greatly reduces low-level programming detail, it offers the potential of significant programmer productivity gains. By freeing programmers from this low-level detail, garbage collection encourages programmers and system designers to dedicate their intellectual efforts to higher-level pursuits, such as the design of fundamental algorithms, user interfaces, and general program functionality. Also, by eliminating many low-level programming concerns, garbage collection reduces the likelihood of programming errors. And finally, dynamic memory management based on copying-types of garbage-collection algorithms are capable of delivering much higher storage throughput than explicit allocation and deallocation, reference-count storage reclamation, and even stack allocation. Together these benefits of garbage collection combine to offer improved software functionality and reliability for lower development costs.

Dynamic management of memory allows memory to serve different needs during different times depending on system workloads and computational modes. The use of dynamic memory management reduces system costs, because common memory resources can be shared between multiple components. Dynamic memory management also facilitates the sharing of information among modules. Often, one module allocates a segment of memory and initializes its contents, and then it passes the address of the shared memory segment to other program components. Thereafter, the shared memory segment serves as a buffer through which any one of the components that shares access to the common segment can broadcast messages to the other components that monitor the shared segment's contents. Finally, dynamic memory management serves to significantly improve software functionality. In traditional software systems, implementations of friendly user interfaces and many important data processing algorithms make extensive use of dynamic memory management.

In spite of the many important uses of dynamic memory management in traditional software systems, developers of real-time systems are reluctant to make use of dynamic memory management in the systems they develop. They are concerned that the timing behavior of dynamic memory allocators and deallocators and the availability of dynamically-managed memory are both unpredictable.

To ignore the potential benefits of dynamic memory management in real-time environments is to seriously hobble real-time system designers and developers. Without dynamic memory management, real-time developers are forced to statically allocate memory for all of the anticipated needs of their applications. In general, this situation results in artificially rigid constraints on applications, because buffers are not allowed to expand or shrink depending on system workload. A further result is an increase in hardware costs, because each word of memory serves only one purpose, throughout execution of the application. Segments of memory that are not currently used sit idle. They cannot be temporarily reallocated to serve different needs.

Traditional techniques for dynamic memory management in imperative languages like C, C++, Pascal, and Ada maintain linked lists of segments of memory that are available to be reallocated. Allocation consists of traversing these linked lists in search of an appropriately sized segment of free memory.

In traditional imperative programming languages, programmers are required to explicitly free memory after the useful lifetime of the corresponding object has expired. The free-memory routine returns the previously allocated object to a linked list of free objects, possibly coalescing the newly-freed object with neighboring objects before linking the free memory onto an appropriate list.

Because of the work involved in traversing lists of free memory segments, allocation of dynamically-managed memory is expensive. Typical implementations of explicit dynamic memory management allocators and deallocators are incompatible with real-time environments, because they offer no upper bound on the time required to allocate or deallocate memory objects. Another reason for real-time developers being reluctant to use dynamic memory management is because it is difficult to prove that a program's execution will not result in excessive fragmentation of the free-memory pool, because typical implementations of dynamic memory managers for traditional imperative languages are not capable of relocating dynamic objects in order to eliminate fragmentation.

Developers of real-time applications who require access to dynamically-managed memory are likely to construct their own memory managers. In order to achieve predictable performance, all memory is allocated from a limited number of free-memory lists, each representing objects of a different fixed size. These memory managers generally make no attempt to coalesce objects. And there is no support for the allocation of arbitrarily large buffers.

Though this technique offers predictable response time, it may be difficult to predict memory utilization. In particular, available memory is intentionally fragmented into free pools representing dynamic objects of each of the sizes supported by the memory manager. Generally, this results in even lower utilization of available memory than the general-purpose allocators described above. Furthermore, software developers are burdened with the responsibility of determining the worst-case number of objects of each size that their application will utilize.

Within such a regimented environment, it is difficult for the application to dynamically configure itself for varying circumstances. In terms of programming ease and application flexibility, an environment in which all dynamic objects must be pre-allocated and object sizes cannot change is only slightly better than an environment that supports no dynamic memory management at all.

BRIEF SUMMARY OF INVENTION

The CPU-controlled garbage-collecting memory module (CPU-C GCMM) is essentially an intelligent memory that connects to a central processing unit (CPU) and performs the routine and repetitive tasks associated with a spectrum of garbage-collecting techniques under the direction and control of the CPU. The CPU-C GCMM performs its garbage-collecting tasks as background tasks to be performed when the CPU-C GCMM is not burdened with the ordinary fetch and store operations necessitated by the application programs being run on the CPU.

The CPU-C GCMM performs memory allocations, on the average, in times comparable to those required by non-garbage-collecting memories and supports configurations that guarantee availability of memory by automatically defragmenting the free pool. Since defragmentation of memory requires that certain live objects be relocated incrementally, it is occasionally necessary to stall memory fetches and stores for a few memory cycles. For typical workloads, these delays are very rare, impeding fewer than 1% of the read operations that miss the cache and fewer than 0.1% of the write operations that escape the cache.

The CPU-C GCMM can be structured in a variety of ways. One species which embodies the essence of the invention includes a memory and a memory controller which provides the means for reading data from and writing data to the memory. The memory controller receives fetch requests directly from the CPU and returns the requested data immediately even though the data may be incorrect in certain instances. A microcontroller which exercises overall control over the component parts of the CPU-C GCMM together with a fetch monitor work together to repair any incorrect data deliveries to the CPU by the memory controller. A communication-channels unit provides the means of communication between the CPU and the microcontroller for handling all interactions between the CPU and the CPU-C GCMM except fetch requests. In order to minimize the interference of garbage-collecting activities with memory access dictated by application programs running on the CPU, the CPU-C GCMM includes an object space manager unit which provides a means for rapidly identifying the header of an object given a pointer to the interior of an object, a task essential for garbage collection in memories used for storing objects. Error controllers are included to assure the integrity of the data retrieved from the memory.

BRIEF DESCRIPTION OF DRAWINGS

FIG. 7 is a C++ pseudocode fragment for the read barrier enforced by the arbiter during reliable hard real-time garbage collection.

FIG. 8 is a C++ pseudocode fragment for the write barrier enforced by the arbiter during reliable hard real-time garbage collection.

FIG. 11 is a C++ pseudocode fragment for the read barrier enforced by the arbiter during mostly-stationary real-time garbage collection.

FIG. 12 is a C++ pseudocode fragment for the read barrier enforced by the arbiter during generational garbage collection.

FIG. 13 is a C++ pseudocode fragment for the write barrier enforced by the arbiter during generational garbage collection.

DESCRIPTION OF THE PREFERRED EMBODIMENT

The CPU-controlled garbage-collecting system that is the subject matter of the present invention provides upper bounds on the time required to allocate or deallocate memory objects and supports configurations that guarantee availability of memory by automatically defragmenting the free-memory pool.

Since compaction (or defragmentation) of memory requires that certain live objects be relocated incrementally, it is occasionally necessary to stall memory fetches and store operations for short periods of time. For the preferred embodiment, the stall times for memory fetches and store operations is no greater than 2 microseconds and 1 microsecond respectively.

For typical workloads, these delays are very rare, impeding fewer than 1% of the read operations that miss the cache and fewer than 0.1% of the write operations that escape the cache. Thus, the average response times for memory fetch and store operations are nearly indistinguishable from the times for traditional memory implementations.

It is important to remember, however, that performance is not the only issue. The present invention also provides the additional benefits of automatically reclaiming unused memory while guaranteeing small upper bounds on the times required to read, write, and allocate objects within the garbage-collected heap.

The garbage collection process which provides the basis of the present invention is derived from the real-time copying process described by H. G. Baker, Jr. in his paper "List Processing in Real Time on a Serial Computer" which was published in *Comm. ACM* 21, 4 (April, 1978), 280–293.

The application program which changes or mutates the contents of memory while garbage collection is taking place will be referred to as the mutator in the material that follows.

The mutator allocates dynamic memory as independent objects. Each object occupies a contiguous segment of memory, the first word of which is a title describing the object's type and size. The completely general garbage collection process supports a variety of object types, including records, weak pointers, and overlapping slices (similar to Icon strings). The process can be fully illuminated, however, by focusing on records.

If any address contained within a record is referenced by a live pointer, the garbage collection system treats the entire object as live. Records to which no live pointers refer are considered dead. Within allocated objects, every 32-bit word is tagged with a 33rd bit that distinguishes descriptors from terminals. The mutator initializes these tag bits using a special I/O instruction at the time of the object's allocation. Once initialized, the tag bits are transparent to the mutator. Memory fetches and stores operate on 32-bit words, ignoring the words' tag bits.

Figure 1:
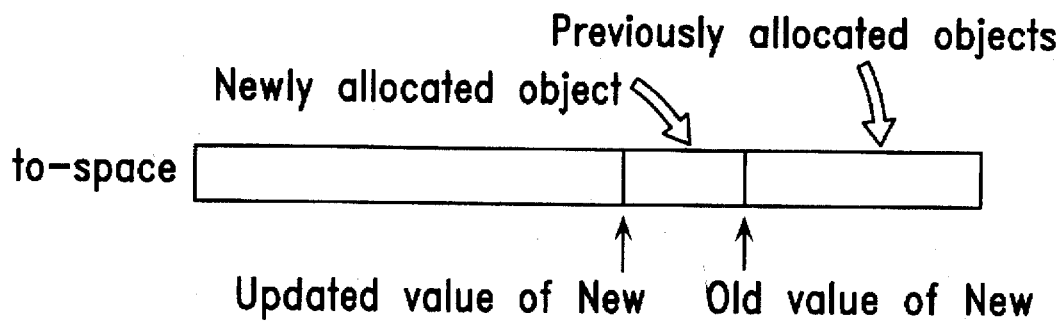
FIG. 1 illustrates the allocation of a new object in memory.

All dynamic objects are allocated from a large region of memory named to-space. Initially, to-space contains no objects, thereby allowing very fast allocation of new objects. Within to-space, the New pointer initially points to the end of to-space. To allocate a new object, the system simply decrements the value of New by the object's size, as illustrated in FIG. 1.

As execution proceeds, the New pointer eventually runs out of space that can be allocated to new objects. When this occurs, garbage collection begins with a garbage collection flip. The system allocates a new to-space, and the old to-space is renamed from-space. Garbage collection consists of incrementally copying live objects out of from-space into to-space. After all of the live objects residing in from-space have been copied into to-space, from-space contains no useful data. At the time of the next flip, the current from-space is renamed to-space.

To minimize the real-time latency of the flip operation, the garbage collection system does not copy all live objects at the time of the flip. Rather, it arranges to copy only those objects that are directly referenced by the system's tended descriptors.

We use the adjective "terminal" to characterize memory locations known not to contain pointers. If all live memory is represented as a directed graph in which nodes represent dynamically-allocated objects and directed edges represent pointers from one object to another, the terminal nodes are those from which no directed edges emanate. The source nodes in this directed graph are pointers residing outside of the CPU-C GCMM. These source pointers, which are under direct control of the CPU, are called "tended descriptors".

Figure 2:
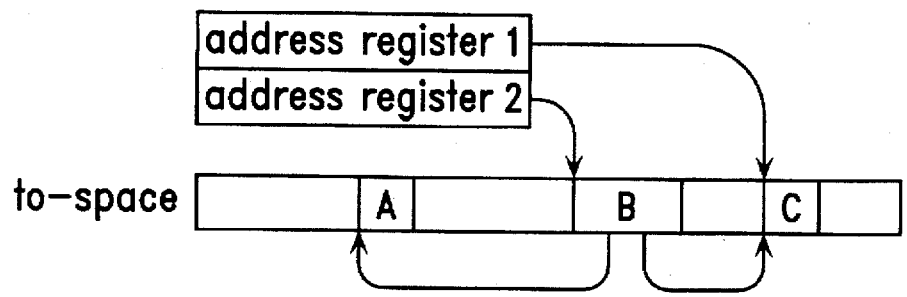
FIG. 2 is a representation of live memory immediately before execution of the garbage collection flip.
Figure 3:
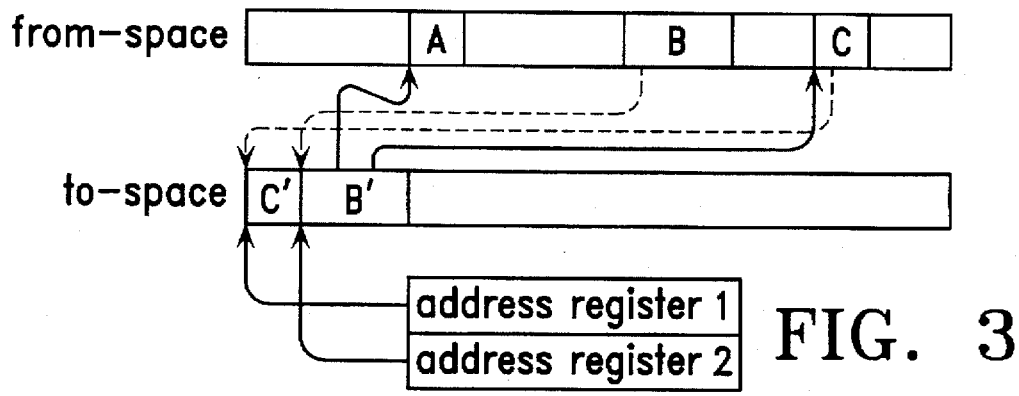
FIG. 3 illustrates a situation where at flip time the garbage collector copies two objects, and two tended descriptors are updated to represent the new locations of these two objects.

For example, suppose the situation illustrated in FIG. 2 represents live memory immediately before execution of the garbage collection flip. There are two tended descriptors, represented by address registers one and two and three live objects labeled A, B, and C. Note that object A is not directly referenced by the mutator. The mutator can only access A by first fetching its address from within object B. At flip time, the garbage collection system copies objects B and C, and the two tended descriptors are updated to represent the new locations of these two objects. The situation is illustrated in FIG. 3.

Objects B and C have been copied verbatim (bitwise) into to-space. For each object copied into to-space, the garbage collection system creates a forwarding pointer from the original object to the new copy of the object. These forwarding pointers are indicated in this illustration as dotted directed edges. Note that object B' contains pointers to the obsolete copies of the A and C objects that reside in from-space. These pointers need to be overwritten with pointers to the new locations of these objects. The garbage collections system's handling of these obsolete pointers is described below.

The flip operation described above is really Baker's original flip process. Baker was primarily interested in garbage collection of Lisp in which all objects are the same size—two words. Compliance with real-time performance constraints requires that the flip operation execute within a small constant time bound. Note that the time required to execute the flip operation described above depends on how much time is required to copy objects B and C out of from-space. This result is unacceptable, because either object may be arbitrarily large. Suppose, for example, that object B were a 524,288-byte bitmap image. Then the flip would require at least 5 ms, the approximate time required to perform 32,768 memory cycles at a rate of 6.5 MHz, each cycle resulting in the transfer of 16 bytes.

Rather than copy objects B and C at flip time, the process used in the present invention simply reserves space within to-space into which the objects will eventually be copied. When the space is reserved, the garbage collection system overwrites the first two words of the reserved space with the object's title and source location respectively. The title word of the from-space version of each object queued for copying is overwritten with a forwarding pointer to the object's new to-space location. This situation is illustrated in FIG. 4.

The Reserved pointer points to the end of memory reserved for copying of objects out of from-space. The Relocated pointer points to the end of memory already copied out of from-space. Following completion of the flip operation, the garbage collection system repeatedly examines the object found at the location named by the Relocated pointer, incrementally copies that object into to-space, and updates Relocated to point to the end of the object that has just been copied.

Pointers contained within the objects that are being copied are tended before they are written to to-space. Tending consists of checking whether the pointer refers to a from-space object, arranging for the from-space object to be copied to to-space if necessary, and updating the pointer to reflect the new to-space location of the object.

Figure 4:
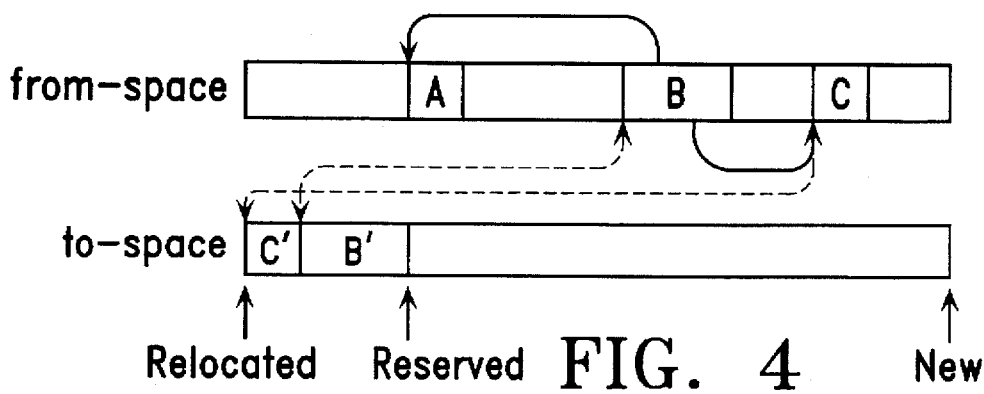
FIG. 4 shows how space is reserved for two objects within to-space into which the objects will eventually be copied.
Figure 5:
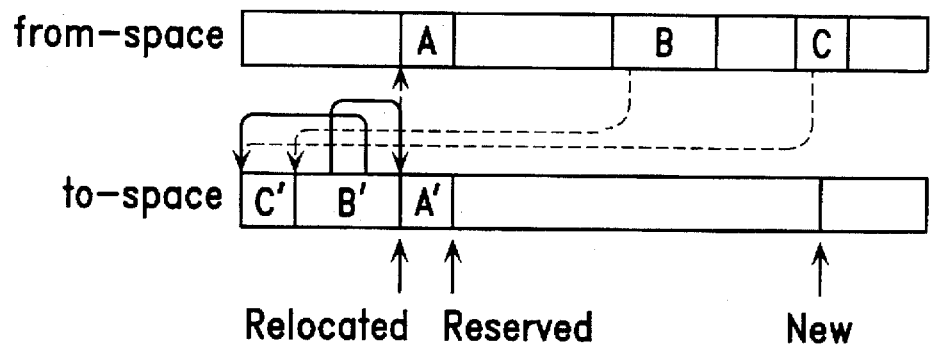
FIG. 5 continues the example shown in FIG. 4 showing memory after the two objects have been copied into to-space.

During copying of B to B' in the example of FIG. 4, two pointers are tended. First, the pointer to A is processed, which causes space to be reserved in to-space for A'. When the pointer to C is processed, the garbage collection system simply looks up the new location of C by examining the forwarding pointer that comprises C's header. After both C and B have been copied, memory appears as shown in FIG. 5.

Note that the reverse link from the to-space objects to their from-space copies is destroyed as a side effect of copying the objects. Also, observe that the New pointer has been adjusted in this illustration to reflect that new memory is typically allocated while old memory is being garbage collected.

While garbage collection is active, certain mutator memory fetch and store operations require special handling. In particular, any attempt to fetch or store memory found between Relocated and Reserved must be redirected to the appropriate location in from-space. Furthermore, after redirecting a memory fetch to from-space, the garbage collection system must tend the fetched word before making it available to the mutator if the word happens to be a descriptor. This interaction between mutator and garbage collection system is the major overhead associated with real-time garbage collection based on Baker's copying technique. The present invention uses special circuitry within the memory subsystem to detect memory fetch and store operations that require special handling.

Figure 6:
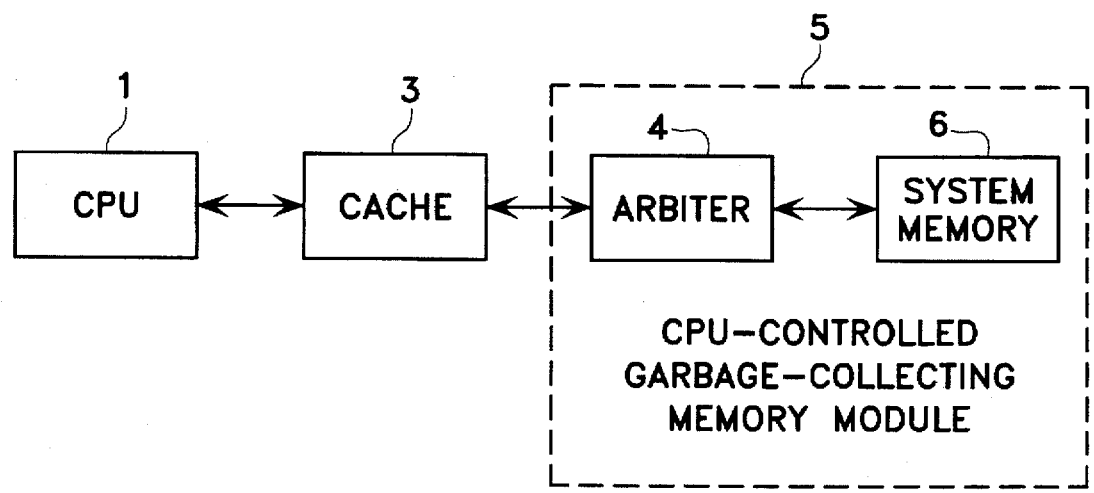
FIG. 6 is a block diagram of the CPU-controlled garbage-collecting system.

A block diagram of the CPU-controlled garbage-collecting system is shown in FIG. 6. It consists of a conventional central processing unit (CPU) 1 and cache 3 to which is connected the CPU-controlled garbage-collecting memory module (CPU-C GCMM) 5. The CPU-C GCMM consists of the arbiter 4 and the system memory 6. The system, as shown in FIG. 6, is intended to perform the usual computational tasks that one expects of a computer system but with the added advantages of real-time garbage collection.

The CPU 1, in addition to performing its primary tasks, oversees the garbage collection effort as directed by the mutator, an overlaying application program. It does this by giving the CPU-C GCMM assignments to perform certain garbage collection services such as scanning particular memory regions in search of pointers and copying blocks of data out of from-space into to-space.

Two extra bits are added to each 32-bit word of the garbage-collected heap to form 34-bit words. One bit serves to distinguish pointer data from non-pointer data and a second bit serves to write-protect certain words so as to prevent runaway applications from corrupting the garbage collection system's internal data structures.

A parity bit is added to each two-word group and four such parity-augmented two-word groups are encoded into a 288-bit error-control block consisting of 278 data bits (including the aforementioned parity bits and a dummy bit), 9 data-dependent error-control code bits, and another parity bit across the entire word, data bits and code bits alike. The error-control process is fully described in L. Howard Pollard, *Computer Design and Architecture*, Prentice Hall, Englewood Cliffs, N.J., 1990, pp. 58–63. The error-control process just described permits the correction of one-bit errors and the detection of two-bit errors.

The parity bit provided for each two-word group permits a response to a two-word read request in less time than the time required to fetch all eight words in an error-control block from memory. It only becomes necessary to fetch all eight words when a parity error is detected in the two-word group, in which case the eight-word error-control block must be fetched for the purpose of correcting the error.

There are a number of alternative-garbage collection techniques that can be practiced with the CPU-C GCMM 5 and which serve the spectrum of needs that are typical of real-time application developers. For each of the garbage collection techniques, it is assumed that the CPU 1 writes back to memory and then invalidates all of the heap data that it might have loaded into its cache. This behavior gives the CPU-C GCMM an opportunity to monitor the progress of the application being executed on the CPU.

One of the alternative garbage-collection techniques is termed reliable hard real-time garbage collection which provides tight bounds on all memory fetch and store operations and on all requests to allocate new dynamic memory. This technique is the one described above and is generally preferred whenever high performance, high reliability, and predictable compliance with real-time constraints are primary concerns, and cost is not a major factor. To support this garbage collection technique, the CPU-C GCMM 5 enforces the read-from-memory barrier in accordance with the C++ pseudocode fragment shown in FIG. 7.

Though the worst-case path through this routine requires approximately 2 microseconds, the typical execution path is to simply fetch the requested data out of to-space and return it. All of the conditional tests are performed in parallel with CPU 1 communications and CPU-C GCMM 5 internal memory operations. Modern CPUs allow speculative responses to memory read operations, and consequently, the CPU-C GCMM is able to forward fetched data to the CPU as soon as it is available from the CPU-C GCMM internal memory and may retract the forwarded data after it has been sent if it determines that additional handling is required.

Write-to-memory operations are also accorded special treatment in the CPU-C GCMM 5 as indicated in the C++ pseudocode fragment shown in FIG. 8.

Although this particular garbage collection technique offers generally good performance, there are circumstances under which alternative garbage collection techniques might be preferable.

Certain workloads are characterized by very high rates of allocation, very short expected lifetimes of allocated objects, and rare occurrences of pointers from old objects to younger objects. For these workloads, generational garbage collection provides better average-case allocation costs but may result in less predictable allocation performance.

Many real-time applications, especially those associated with consumer electronics devices, must sacrifice some degree of performance and reliability in order to reduce system costs. In these systems, memory may represent the single most expensive hardware component. Since fully-copying real-time garbage collection supports no more than 50% memory utilization, designers of these systems are likely to view this garbage collection technique as a luxury that they simply cannot afford.

An uncooperative garbage collection environment is one in which it is not possible to distinguish all pointers from non-pointers. Conservative garbage collectors, which are designed to operate in these environments, treat every word as if it might contain a pointer. Given that the collector does not know for sure whether a particular word is meant to represent a pointer or a non-pointer, conservative garbage collectors cannot relocate live objects in order to reduce memory fragmentation.

Figures 9, 10:
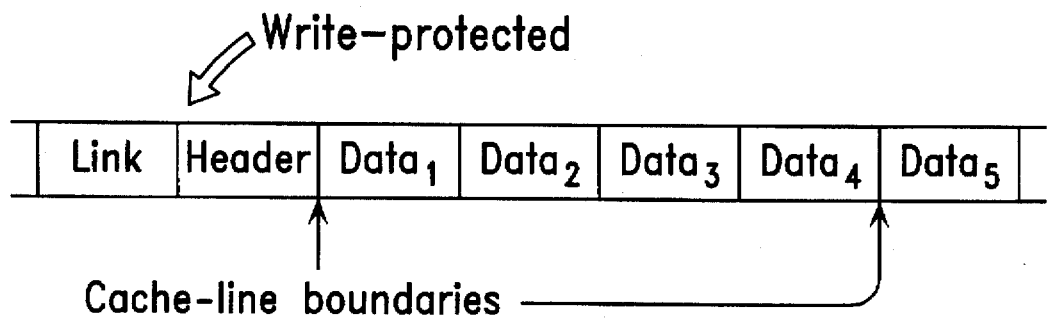
FIG. 9 illustrates how heap objects are aligned with cache-line boundaries in conservative garbage collection.
FIG. 10 is a C++ pseudocode fragment for the read barrier enforced by the arbiter during real-time conservative garbage collection.

With conservative garbage collection, objects are never relocated. Thus, the free pool is represented as linked lists of free memory. Heap objects are aligned with cache-line boundaries as shown in FIG. 9. The header field identifies the type and size of each object. A special type tag identifies objects that are in the free pool.

The CPU-C GCMM 5 uses traditional mark-and-sweep techniques as the means for accomplishing conservative garbage collection. For live objects, the link field serves to distinguish marked objects from unmarked objects. In unmarked objects, the link field has a value of NULL. For marked objects, the link field points to the next marked object on a linked list that contains all marked objects. The free pool is represented by several doubly-linked lists, each list representing free objects of a different minimum size. The link field serves as a forward link and the first word of the data field serves as a backward link. By doubly linking the free lists, neighboring free objects can be coalesced in constant time.

Garbage collection consists of marking each of the objects in the set of root pointers, incrementally scanning the contents of each marked object in order to mark all of the objects referenced by previously marked objects, and sweeping through memory to reclaim unmarked objects for the free pool and to reset the link field on marked objects to NULL.

During garbage collection, the read-from-memory C++ fragment shown in FIG. 10 is active. This code returns the fetched value before providing whatever special handling is required. Note that this code checks whether the fetched value is a pointer before attempting to mark the referenced object. At allocation time, the programmer may specify that certain objects are known not to contain pointers. Thus, garbage collection is only partially conservative.

New memory can be allocated from the free lists while garbage collection is active. The worst-case time required to perform garbage collection is the time to mark, scan, and sweep the entire garbage-collected heap. This time can be bounded. By maintaining a tally of the total size of the objects linked onto the free lists, it is possible to pace the allocation of new memory against the rate of garbage collection: simply divide the total amount of free memory evenly between the various garbage-collection steps that must be performed.

Note that conservative garbage collection does not defragment memory. Furthermore, it cannot guarantee that integer values will not be misinterpreted as pointers. Thus, this garbage collection technique cannot promise real-time response to allocation requests.

In mostly-stationary real-time garbage collection, the heap is divided into N equi-sized demispaces where N is an integer greater than two. During each garbage-collection pass, one of these demispaces is designated as to-space and another as from-space. Live objects are incrementally copied out of from-space into to-space. All of the other demispaces are garbage collected using incremental mark-and-sweep, similar to the technique used for conservative garbage collection except that greater care is taken to distinguish between memory cells that contain pointers and those that do not contain pointers.

On each pass of the garbage collector, the demispace that contains the largest amount of free memory is designated to be from-space. New objects can be allocated both from the free lists and from to-space. It is preferable to allocate new memory from whichever demispace is most crowded in order to pack as much useful information as possible into that demispace.

These heuristics combine to maximize the amount of garbage to be defragmented during the next garbage collection pass. If, following completion of garbage collection, to-space has enough free memory to accommodate the copying of all the live objects from some other demispace, then that demispace can be selected as from-space without changing the current to-space for the next pass of the garbage collector.

The CPU-C GCMM 5 read barrier is configured as shown by the C++ pseudocode fragment shown in FIG. 11. The write barrier is the same as for fully-copying real-time garbage collection.

In comparison with fully-copying real-time garbage collection, the primary advantage of this technique is that it allows up to (N−1)/N of the heap to be utilized, while still supporting automatic defragmentation of memory. A disadvantage of the mark-and-sweep garbage collection technique is that it is slightly less time efficient than copying garbage collection, and no object may exceed the demispace size.

During garbage collection, new objects can be allocated from the high end of to-space and also from free lists representing available memory in the N−2 demispaces not currently serving as to-space and from-space. Pacing of allocation against garbage collection rates uses a combination of the techniques described for conservative and fully-copying real-time garbage collection.

Generational garbage collection offers the potential of improved average-case performance over fully-copying and mostly-stationary garbage collection techniques. However, the worst-case time required to allocate new memory may be higher, since garbage collection of the youngest generation is not guaranteed to reclaim any garbage even though a high percentage of that generation may consist only of garbage.

Real-time generational garbage collection in the CPU-C GCMM 5 context is patterned after the technique described earlier in connection with mostly-stationary garbage collection and utilizes two generations. It is assumed that the garbage-collected heap consists of N equi-sized demispaces where N is an integer greater than two. The nursery consists of two demispaces which alternate as to-space and from-space. The remaining N−2 demispaces represent the second generation. Within the second generation, new memory is allocated from free lists, and garbage collection uses traditional mark-and-sweep techniques. The main differences between mostly-stationary garbage collection and generational garbage collection are that the generational garbage collector's write barrier maintains a log of the to-space pointers written into the second generation, and the read barrier does not give any special handling to pointers that point outside of to-space.

Initially, the nursery and the mark-and-sweep region are both known to be empty. All new objects are allocated from within the nursery. When the nursery fills, traditional copying techniques are used to collect garbage.

Garbage collection begins by tending all of the application's root pointers. For each pointer that refers to from-space, arrangements are made to copy the object to to-space if necessary, and the pointer is adjusted so that it refers to the to-space copy of the referenced object.

After tending the application's root pointers, the garbage collector scans all of the addresses mentioned in the cross-generational log. For each address so scanned, the garbage collector removes the address from the cross-generational log if that address no longer contains a pointer into the nursery.

For each live object within the nursery, a count is maintained within the live object's header of how many times the object has been copied between from-space and to-space. For many applications, a large majority of the allocated objects die young. Only rarely do objects survive more than a few garbage collection flips. If an object is copied more than say five times, it is considered worthy of promotion into the mark-and-sweep space. Rather than being copied into to-space, this object is copied into the mark-and-sweep region.

Objects are copied incrementally into contiguous segments of available memory within the mark-and-sweep region. Two additional state registers called MSRelocated and MSReserved are required in order to support this incremental copying process. If there is not enough contiguous memory within the mark-and-sweep region to store new candidates for promotion, promotions are delayed until a subsequent garbage collection pass.

As an object is copied into the mark-and-sweep region, the object is scanned for pointers contained within the object. For each pointer that refers to from-space, the object to which the pointer points is relocated to to-space if necessary, and the pointer is modified so that it refers to the to-space copy of the referenced object. The address of each to-space pointer written into the mark-and-sweep region by the copying process is also written into the cross-generational log.

The cross-generational log is simply a list of addresses that must be scanned each time garbage collection begins. If the allocated memory for this list is not large enough to represent all of the cross-generational pointers that exist in the system, a flag is set. If this flag is set when the next garbage collection pass begins, a full mostly-stationary garbage collection is performed ignoring the cross-generational log. During the mostly-stationary garbage collection pass, the cross-generational log is reconstructed based on the live objects that are scanned in preparation for using generational techniques during the next pass of the garbage collector. If the log overflows again, the next pass will once again need to use mostly-stationary techniques.

If generational garbage collection of the nursery fails to reclaim sufficient memory to serve an application's ongoing memory allocation needs, the system performs a mostly-stationary full garbage collection. If, following the full garbage collection, memory is too fragmented, additional full garbage collections can be performed, each one compacting a different demispace.

The read barrier enforced in the generational garbage collection mode is illustrated by the C++ pseudocode fragment shown in FIG. 12. The write barrier is shown in FIG. 13.

Figure 14:
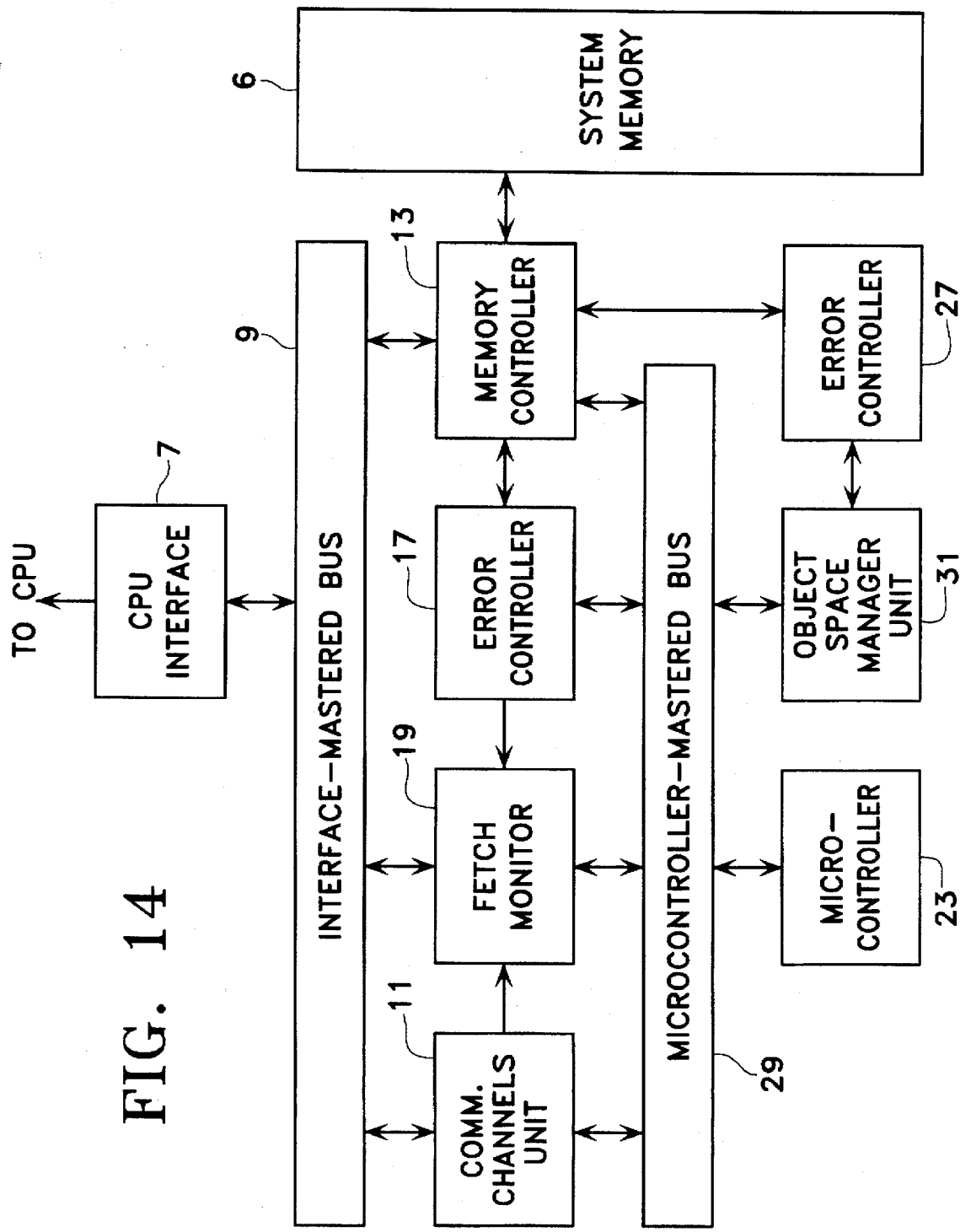
FIG. 14 is a block diagram of the CPU-controlled garbage-collecting memory module.

A block diagram of the CPU-C GCMM 5 is shown in FIG. 14. The CPU-C GCMM would be implemented as an application-specific integrated circuit (ASIC) chip.

The CPU interface 7 connects the CPU-C GCMM 5 to the CPU 1 directly or, if a cache 3 exists, through the cache to the CPU. The CPU interface processes memory store and fetch operations and input/output operations by transmitting appropriate commands and data to one or more units in the CPU-C GCMM via the interface-mastered bus 9. Store requests are directed to the communication channels unit 11. Fetch requests are routed directly to the memory controller 13.

The result of each read operation is forwarded speculatively to the CPU 1. On the subsequent machine cycle, the CPU-C GCMM 5 retracts the data by sending a "retry fetch" signal to the CPU if an error or a conflict with an intermediate garbage-collecting state is detected. If the CPU does not support speculative data forwarding in response to fetch requests, the CPU-C GCMM 5 stalls the CPU until it has obtained the data from the appropriate memory chip and verified that the data is correct.

A memory fetch request by the CPU 1 is transmitted by the CPU interface 7 to the memory controller 13. To minimize communication delays, it is desirable that this component not impose a clock-delay on each CPU memory transaction. Consequently, the CPU interface simply gates the appropriate CPU signals onto the interface-mastered bus 9 so that they can be clocked into the various components that monitor this bus. The memory controller, after retrieving the requested data from the system memory 6, immediately forwards the retrieved data to the CPU via the CPU interface. Simultaneously, the retrieved data is examined for errors by the error controller 17.

The fetch monitor 19 monitors each fetch request that is issued by the CPU 1. It monitors both the address of the requested fetch and the values produced by memory controller 13. If either indicates that special handling is required, the fetch monitor sends a special "retry fetch" signal to the CPU on its next clock cycle.

In determining whether special handling is required, the fetch monitor 19 receives a signal from the error controller 17 indicating whether the fetched data was found to have a parity error and from the communication channels unit 11 indicating whether the data to be fetched currently resides in the system's write buffers. Additionally, the fetch monitor checks whether the fetch address lies between Relocated and Reserved in system memory or if the retrieved data is from from-space and represents a pointer to from-space. The microcontroller 23 keeps the fetch monitor informed as to the regions of memory that constitutes to-space and from-space, the current values of the Relocated, Reserved, MSRelocated, and MSReserved registers, and whether the current mode of garbage collection is generational, mark-and-sweep, fully-copying, or partially-copying.

If the fetch monitor 19 objects to the fetch transaction, the CPU interface 7 directs the CPU 1 to retry the fetch operation and at the same time holds in a register the most recent fetch request for which a retry directive was issued. When the CPU retries the fetch operation, the CPU interface directs the fetch to one of the registers in the communication channels unit 11 and thereby returns the result eventually made available in the communication register channels register by the microcontroller 23.

The error controller 17, under the control of the memory controller 13, performs three operations: (1) it adds a parity bit to each two-word group of an eight-word group obtained from the memory controller 13 and encodes the four parity-augmented two-word groups into an error-control block for storage in system memory 6; (2) it detects single errors in two-word groups obtained from system memory via the memory controller; and (3) it detects double errors and corrects single errors in an error-control block obtained from system memory via the memory controller.

The system memory 6 accepts and delivers data in 72-bit groups. In order to accommodate this characteristic of system memory, the 288-bit error-control block is structured as four 72-bit blocks, each 72-bit block consisting of 68 data bits corresponding to two 34-bit words, the parity bit associated with the two 34-bit words, and three bits selected from the 12 bits comprising the 9 error-control code bits, the parity bit used for double-error detection, and two dummy bits.

The error controller 17 has a 288-line data port to the memory controller 13 by which eight words at a time can be read or written. The memory controller automatically provides the error controller with a copy of the error-control block each time it responds to one of the CPU's fetch requests. If the error controller detects an error, it notifies the fetch monitor 19 in time for the fetch monitor to advise the CPU when the next machine cycle occurs that the returned data is invalid and that the CPU should retry the fetch request.

The memory controller 13 also reads and writes an update buffer consisting of eight 34-bit registers within the error controller 17 in response to requests issued to the memory controller by the microcontroller 23. The memory controller exercises control over the error controller by means of three control lines which carry binary control data. The control codes and the associated operations to be performed by the error controller are as follows:

000—Do nothing;

100—Transfer 288 bits from the memory controller 13 into the checksum buffer and test it for 2-bit errors, and if a 1- or 2-bit error is detected, signal the fetch monitor 19 prior to the next clock;

101—Transfer 72 bits from the memory controller 13 into the checksum buffer and test it for a 1-bit error, and if a 1-bit error is detected, signal the fetch monitor 19 prior to the next clock;

110—Transfer 288-bit error-control block corresponding to the 272 bits contained in the update buffer into the memory controller 13;

111—Transfer error-corrected 272 bits from the 288-bit error control block from the memory controller 13 into the 272-bit update buffer.

When the microcontroller 23 receives the CPU's write request from the message FIFO buffer in the communication channels unit 11, it requests that the memory controller copy the corresponding 288-bit error-control block from memory 6 into the error controller 17 which performs the error-correction function and transfers the 272 error-corrected bits from the error-control block into the update buffer. Once the data has been loaded into this buffer, the microcontroller modifies the relevant words if they are not write-protected and then requests that the memory controller copy the modified 272 bits in the update buffer, after encoding into the 288-bit error-control block by the error controller, back to memory. The error-control block is automatically recomputed within one clock cycle following each change to the update buffer.

The update buffer is also used to service memory fetch requests in the case where a parity error is detected. If a 1- or 2-bit parity error is detected by the error controller 17, the error controller notifies the fetch monitor 19 which advises the CPU 1 via the CPU interface 7 to retry its fetch while advising the microcontroller 23 that a fetch request is about to be retried because of a parity error. The microcontroller then arranges to load the update buffer with the error-corrected 272 bits from the corresponding 288-bit error-control block. Then the microcontroller copies the data to the appropriate register of the communication channels unit from whence the CPU interface 76 will fetch it.

The error controller 17 responds to commands from the microcontroller 23 with respect to operations involving the eight-word update buffer as follows:

TEST-FOR-DIRTY—Returns a non-zero value if the buffer has been modified since it was loaded or most recently written back to memory;

DISCARD-CONTENTS—Marks the buffer's contents as invalid;

TEST-FOR-VALID—Returns valid indication if new data has been loaded into the update buffer following the most recent "discard contents" operation;

FETCH-TWO-WORDS(address-of-first-word)—Returns the two 34-bit words found at the specified offset within the update buffer;

OVERWRITE-ONE-WORD-IF-NOT-PROTECTED (address)—See next command;

OVERWRITE-TWO-WORDS-IF-NOT-PROTECTED (address-of-first-word)—Overwrites one or two 32-bit words at specified offset within the update buffer unless words are write-protected (two-word updates must be in the same parity-augmented two-word group);

TAGGED-OVERWRITE-ONE-WORD-IF-NOT-PROTECTED(address)—See next command;

TAGGED-OVERWRITE-TWO-WORDS-IF-NOT-PROTECTED(address-of-first-word)—Overwrites one or two 33-bit words (the in 33rd bit in each word serves as the descriptor bit) at specified offset within the update buffer unless words are write-protected (two-word updates must be in the same parity-augmented two-word group);

OVERWRITE-ONE-WORD(address)—See next command;

OVERWRITE-TWO-WORDS(address-of-first-word)—Overwrites one or two 34-bit words (the 33rd bit and the 34th bit in each word serve respectively as the descriptor tag and the write-protect tag) at specified offset within the update buffer unless words are write-protected (two-word updates must be in the same parity-augmented two-word group).

In general, it is possible for the error controller 17 to interact with both the memory controller 13 and the microcontroller 23 in the same machine cycle. It is the microcontroller's responsibility to guard against trying to save the update buffer to memory in the same cycle that the update buffer is being modified, because in such a situation, the error-control block will not be valid.

The fetch monitor 19 examines every memory fetch operation and advises the CPU to retry the fetch request whenever the transferred data is invalid. If an error was detected by the error controller 17, the fetch monitor notifies the microcontroller 23 with an interrupt signal so that the microcontroller can perform the required fixup.

The address of each fetch request is latched into an internal buffer in the fetch monitor 19 named FetchAddr and the value fetched from system memory 6 is latched into an internal buffer named FetchData. The fetch monitor also maintains a four-register FIFO memory of fetch addresses from which the microcontroller 23 is able to extract entries. The microcontroller uses these addresses to guide its construction of prefetch "hints" which it forwards to the memory controller 13.

The fetch monitor 19 also monitors the status of the error controller 17 and a hit indicator from the communication channels unit 11. The fetch monitor also observes transactions involving the communication channels unit 11 for the purpose of stalling any fetch from an address in the range affected by an ongoing initialization of a region of memory to zero.

There are several configuration registers within the fetch monitor 19 which govern its behavior. These configuration registers are set by commands from the microcontroller 23.

The communication channels unit 11 facilitates the exchange of information between the CPU 1 and the microcontroller 23 via the CPU interface 7. Messages sent by the CPU include the following:

Special-Operation Requests—When the CPU 1 allocates an object, it notifies the microcontroller 23 of the object's location, size, and type by sending a special message. Additional messages are sent whenever the CPU changes the type of a particular memory cell or explicitly reclaims the memory of a previously-allocated object.

Memory-Write Operations—Memory writes are directed to a write buffer in the communication channels unit 11. Since the CPU uses a write-back cache, writes are very rare in comparison with reads. Furthermore, the work required to handle write operations is considerable in that it must be verified that the word is not write-protected before overwriting it. For these reasons, performance is benefitted by queuing writes rather than stalling the CPU while they are serviced.

A 32-register FIFO buffer in the communication channels unit 11 maintains the queue of messages sent from the CPU 1 to the microcontroller 23. A second 32-register FIFO buffer maintains the queue of addresses to be overwritten by buffered write and initialize-block requests. Each message gives the number of registers that are associated with the message in the address queue. As entries are removed from the message queue, the associated entries in the address queue are also removed.

The communication channels unit 11 monitors fetch requests and checks each to see if the fetch address is in the range of addresses affected by one of the pending write or initialize-block requests. If so, the communication channels unit notifies the fetch monitor 19 so that the two copies of information can by synchronized before responding to the fetch request.

Communication from the microcontroller 23 to the CPU 1 serves primarily to advise the CPU of the microcontroller's status. Sixteen 32-bit registers are provided within the communication channels module to serve these purposes. These registers are read-only to the CPU interface 7 and write-only to the microcontroller.

The first eight of these registers are tagged as to their validity. When the microcontroller updates a register, the register is tagged as valid. When the CPU interface 7 fetches from a register, the register is tagged as invalid. If the CPU interface attempts to read from a register that is currently invalid, the system stalls the CPU until the microcontroller updates the value. The microcontroller may overwrite a valid register with new data.

The other eight registers are always considered valid. The microcontroller 23 may update these registers at any time, and the CPU interface 7 may read the current value of these registers at any time.

The usage of the sixteen 32-bit registers that comprise the communication channels unit 11 link from the microcontroller 23 to the CPU interface 7 depends on the mode of operation. Typically, the first eight registers are used to provide responses to particular operation requests issued by way of the CPU interface. For example, if the CPU requests the address at which the object containing a particular address resides, the response might be delivered in register number 2. Registers 0 and 1 are reserved for the data requested by memory fetch requests that require special handling. Registers 8 through 15 are typically used to apprise the CPU interface of garbage collection status. For example, register 8 might hold a "reasonably current" value of the Relocated register, and register 9 might hold a recently updated value of the Reserved register. The CPU can query these I/O ports to assess the progress of garbage collection.

The memory controller 13 receives commands from the CPU interface 7 and from the microcontroller 23. It gives priority to servicing requests from the CPU interface. The only command given by the CPU interface is a two-word fetch. In response to this command, the memory controller fetches either the 72-bit block containing the two words or the 288-bit error-control block from system memory 6, depending on the operating mode of the memory controller, and returns the two words to the CPU interface. The memory controller also copies the 72-bit block or the 288-bit error-control block containing the 72-bit block to the error controller 17 and requests that the data be validated.

The memory controller 13 operates in either a normal mode or an ultra-reliable mode. In the normal mode, the memory controller fetches a 72-bit block and copies it to the error controller 17 which tests only for a single bit error in the parity-augmented two-word group. In the ultra-reliable mode, the memory controller fetches a 288-bit block and copies it to the error controller 17 which then detects two bit errors or corrects a single bit error in the error-control block.

The microcontroller 23 exercises considerably more control over the memory controller 13 than does the CPU interface 7. The microcontroller-memory controller command library is as follows:

SET RELIABILITY MODE—to normal or ultra-reliable;
PREFETCH 288-BIT ERROR-CONTROL BLOCK—from specified address in system memory 6;
LOAD 288-BIT ERROR-CONTROL BLOCK—from specified address in system memory 6 into update buffer of error controller 17;
STORE 288-BIT ERROR-CONTROL BLOCK—from update buffer of error controller 17 to specified address in system memory 6;
LOAD 144-BIT ERROR-CONTROL BLOCK—from specified address in system memory 6 into a latch in error controller 27;
STORE 144-BIT ERROR-CONTROL BLOCK—from error controller 27 latch to specified address in system memory 6;
INITIALIZE ERROR CONTROLLER 27—to contain all zeros;
CHECK STATUS AND RESULT—to see if previous operation was completed.

The memory controller 13 maintains a write buffer consisting of eight 576-bit registers to hold pending writes and a small cache of prefetched data. The validity and the modification status of each contiguous 144-bit group stored in each 576-bit register are denoted by bits stored in an 8-bit register associated with each 576-bit register.

A write that refers to segments of memory already residing in the write buffer is automatically merged with the write in the relevant write-buffer register.

The memory controller 13 selects for performance at any given time the highest priority pending operation. If a high-priority request arrives while the memory controller is working on a low-priority operation, the high-priority request waits for the low-priority operation to be completed. Upon completion of an operation, the memory controller selects the next operation from the following prioritized list:

1. If there is a pending fetch request from the CPU 1, service it;
2. If there is a pending operation from the microcontroller 23, respond to it;
3. If the write buffer contains more than six entries, service one of the write entries;
4. If the prefetch buffer contains prefetch hints, service one of the prefetch requests;
5. If the write buffer is not empty, service the leading entry.

The memory controller 13 maintains a 4-register FIFO for holding suggested prefetch addresses. Thus, only the four most recent prefetch hints are retained.

The cache in the memory controller 13 consists of 16 288-bit registers. The validity of each contiguous 72-bit group stored in each 288-bit register is denoted by bits stored in a 4-bit register associated with each 288-bit register. Whenever a request is made to fetch less than a full 288-bit word, the memory controller inserts a prefetch hint for the surrounding block into its own prefetch FIFO.

The microcontroller 23 orchestrates CPU-C GCMM operations by issuing I/O commands to the other CPU-C GCMM units via the microcontroller-mastered bus 29. The bus supports a 7-bit I/O address space and 68 bits of data. Each unit connected to the bus utilizes multiple ports in the address space. Typically, each of the operations performed by the units connected to the bus is invoked by transmitting the relevant parameters to the particular unit involved through a particular port dedicated to the unit and the operation performed.

The microcontroller 23 is a very simple reduced-instruction-set controller of custom design. It is patterned after the MIPS R2000 architecture except that each register is 34 instead of 32 bits wide. The extra two bits serve as write-protect and descriptor tag bits. The microcontroller includes a small bank of 4K×32-bit fast (no-delay) static RAM which holds writable microcode and a very limited amount of data. The R2000's sw instruction ignores the tag bits, and the lw instruction clears both tag bits to zero. Like the R2000, the microcontroller 23 does not enforce data dependency interlocks.

The microcontroller 23 provides the following special instructions:

iw—Input one word from specified I/O address to specified register;

id—Input two words from specified I/O address to specified register pair;

ow—Output one word to specified I/O address from specified register;

od—Output two words to specified I/O address from specified register pair;

movd—Move only the data portion (32 bits) of source register to destination register;

stw—Store tagged word to memory (this instruction stores the 32-bit data word to the specified memory location, and stores the two tag bits, padded with 30 zeros, to the following memory location—instruction requires two memory cycles);

ltw—Load tagged word from memory (this instruction restores the effect of a stw instruction);

setdt—Set the descriptor tag of the specified register to 1;

cldt—Clear the descriptor tag of the specified register to 0;

setwpt—Set the write-protect tag of the specified register to 1;

clrwpt—Clear the write-protect tag of the specified register to 0;

bwpt—Branch if the write-protect tag of the specified register is 1;

bbs—Branch if the bit at immediate position i in the specified register is set;

bdt—Branch if the descriptor tag of the specified register is 1;

cfi—Check for interrupt (since frequent interrupts are to be expected and it is important to avoid interrupts during critical sections of code, responses to interrupts are made explicitly).

Efficient communication between the CPU 1 and the microcontroller 23 are provided by means of the communication channels unit 11.

The microcontroller 23 gives highest priority to servicing of pending CPU fetch operations that require special handling. At a lower priority, the microcontroller alternates between the following two activities:

If there is a queued operation request, including a queued memory update operation, in the communication channels unit 11, servicing the queued operation;

Examining recent memory transactions and issuing prefetch hints to the memory controller 13.

Prefetch hints represent a mechanism whereby the 10–100 cycle latency associated with typical memory fetch operations may be avoided. The hints issued by the microcontroller 23 are based on the following heuristics:

If memory block N was recently fetched, then it is likely that memory block N+1 will be accessed in the near future. So the microcontroller issues a prefetch hint for memory block N+1.

If memory blocks N, N+c, and N+2c were recently fetched where c is an integer constant (possibly negative), then it is likely that memory block N+3c will be accessed in the near future. So the microcontroller issues a prefetch hint for memory block N+3c.

If memory block N was recently fetched, and the fetched block was seen to contain a pointer to memory block M, then it is likely that memory block M will be accessed in the near future. So the microcontroller issues a prefetch hint for memory block M.

The effectiveness of these various prefetch heuristics varies between workloads. Note that these three heuristics may suggest contradictory prefetch addresses. Though it is possible to prefetch all of the addresses suggested by each of the heuristics, this might overload the memory system's bandwidth, resulting in worse performance than if no prefetching were performed at all. To optimize system performance, the microcontroller maintains a limited history of recently issued prefetch hints and records whether each hint was effective in predicting a subsequent memory access. The microcontroller monitors this history in order to decide which patterns of usage are most common in the current application and gives preference to the heuristics that have proven themselves most effective during the recent execution history of this application.

The purpose of the object space manager unit 31 is to provide a means for determining the address A in object memory of the header of an object from the address B of any word in the object, where the object occupies all address locations between A and C, C being the address of the last word of the object, the numerical value of C always being equal to or greater than that of A.

The object space manager unit 31 accomplishes its purpose by storing in a "code memory" a level-1 code, a level-2 code, and a level-3 code for each object word stored in object memory. If the binary representations of the header address A and the object word address B are $A_{18}A_{17}A_{16}\ldots A_0$ and $B_{18}B_{17}B_{16}\ldots B_0$ respectively (ignoring for the moment the semi-space bits $A_{19}$ and $B_{19}$), then the codes are as follows (the "X's" stand for "don't care"):

$$\text{level-1 code:} \begin{cases} 1A_5A_4\ldots A_0; & A_{18}A_{17}\ldots A_6 = B_{18}B_{17}\ldots B_6 \\ 0X_5X_4\ldots X_0; & \text{otherwise} \end{cases}$$

$$\text{level-2 code:} \begin{cases} 1A_{12}A_{11}\ldots A_0; & \begin{cases} A_{18}A_{17}\ldots A_6 \neq B_{18}B_{17}\ldots B_6 \\ \text{and} \\ A_{18}A_{17}\ldots A_{13} = B_{18}B_{17}\ldots B_{13} \end{cases} \\ 0X_{12}X_{11}\ldots X_0; & \text{otherwise} \end{cases}$$

$$\text{level-3 code:} \begin{cases} 1A_{18}A_{17}\ldots A_0; & A_{18}A_{17}\ldots A_{13} \neq B_{18}B_{17}\ldots B_{13} \\ 0X_{18}X_{17}\ldots X_0; & \text{otherwise} \end{cases}$$

The most significant bit in the level-1, level-2, and level-3 codes is called the "valid data" bit. A "0" indicates that the word is invalid while a "1" indicates that the word is valid.

The level-1 codes for all addresses in a semi-space must be stored, each address being assigned a slot in a level-1 group.

The level-2 codes need only be stored for all level-1 groups defined by the 13 most significant bits after the most significant bit (the bit that identifies the semi-space) of an object memory address since the codes are the same for all addresses within a level-1 group. Each level-2 code occupies a slot in a level-2 group, there being a one-to-one correspondence between the level-2 slots and the level-1 groups.

The level-3 codes need only be stored for all level-2 groups defined by the 6 most significant bits after the most significant bit of an object memory address since the codes are the same for all addresses within a level-2 group. Each level-3 code occupies a slot in the single level-3 group, there being a one-to-one correspondence between the level-3 slots and the level-2 groups.

The header of an object having a word stored at address B is determined by retrieving from code memory as needed the level-1 code in the slot corresponding to address B, the level-2 code in the slot corresponding to the level-1 group containing B, and the level-3 code in the slot corresponding to the level-2 group containing B.

If the "valid data" bit of the level-1 code equals 1, the header address is a combination of the level-1 code without the "valid data" bit and the most significant bits of B: $B_{18}B_{17} \ldots B_6 A_5 A_4 \ldots A_0$.

If the "valid data" bit for the level-1 code is 0 and the "valid data" bit for the level-2 code is 1, the header address is a combination of the level-2 code without the "valid data" bit and the most significant bits of B: $B_{18}B_{17} \ldots B_{13}A_{12}A_{11} \ldots A_0$.

If the "valid data" bits for both level-1 and level-2 codes are 0 and the "valid data" bit for the level-3 code is 1, then the header address is the level-3 code without the "valid data" bit.

If the "valid data" bits for all three levels is 0, then there is no header address corresponding to the codes.

The number of groups, the number of slots per group for holding codes, and the number of bits per slot as a function of level is as follows:

| Level | No. of Groups | No. of Slots per Group | Bits per Slot |
|---|---|---|---|
| 1 | 8192 | 64 | 7 |
| 2 | 64 | 128 | 14 |
| 3 | 1 | 64 | 19 |

Levels one and two of the object space hierarchy reside in the system memory 6. The object space manager unit 31 maintains a cache of eight level-1 groups and four level-2 groups.

The microcontroller 23 closely controls the object space manager unit 31. For example, the microcontroller explicitly selects which groups are placed in which cache lines. In manipulating the cache-line tags, the microcontroller performs the following operations:

TAG-LEVEL-1-SLOT(slot no.,address)—Tags the specified slot of the level-1 cache with the specified address;

TAG-LEVEL-2-SLOT(slot no.,address)—Tags the specified slot of the level-2 cache with the specified address;

LOOKUP-LEVEL-1-ADDRESS(address)—Searches for the specified address in the level-1 cache and returns the slot number if found or −1 if not found;

LOOKUP-LEVEL-2-ADDRESS(address)—Searches for the specified address in the level-2 cache and returns the slot number if found or −1 if not found;

INVALIDATE-LEVEL-1-TAG(slot no.)—Marks the specified slot as unused (subsequent LOOKUP operations will ignore this slot);

INVALIDATE-LEVEL-2-TAG(slot no.)—Marks the specified slot as unused (subsequent LOOKUP operations will ignore this slot).

The microcontroller 23 also transfers the data associated with each cache line.

A level-1 code consists of a "valid data" bit and a binary number representing the offset of the object header from the 0'th slot in a level-1 group. A code in the 0'th slot can only refer to an object header in the same slot and consequently it is unnecessary to specify the offset. Thus, the code in the 0'th slot requires only a "valid data" bit.

A code in the 1'th slot can specify a header in either the 0'th or 1'th slot and thus requires 1 bit to specify the offset. A complete code consists of 2 bits—the "valid data" bit and the "offset" bit.

A code in the 2'th slot can specify a header in either the 0'th, the 1'th, or the 2'th slot and thus requires 2 bits to specify the offset. The specification of a complete code in this case requires 3 bits.

The number of bits required to specify the level-1 codes for the 64 slots in a group are given below.

| Slot | No. of Bits | Bit Nos. |
|---|---|---|
| First Segment | | |
| 0 | 1 | 0 |
| 1 | 2 | 1–2 |
| 2 | 3 | 3–5 |
| 3 | 3 | 6–8 |
| 4 | 4 | 9–12 |
| 5 | 4 | 13–16 |
| 6 | 4 | 17–20 |
| 7 | 4 | 21–24 |
| 8 | 5 | 25–29 |
| 9 | 5 | 30–34 |
| 10 | 5 | 35–39 |
| 11 | 5 | 40–44 |
| 12 | 5 | 45–49 |
| 13 | 5 | 50–54 |
| 14 | 5 | 55–60 |
| 15 | 5 | 61–64 |
| 16 | 6 | 65–70 |
| 17 | 6 | 71–77 |
| 18 | 6 | 78–82 |
| 19 | 6 | 83–88 |
| 20 | 6 | 89–94 |
| 21 | 6 | 95–100 |
| 22 | 6 | 101–106 |
| 23 | 6 | 107–112 |
| 24 | 6 | 113–118 |
| 25 | 6 | 119–124 |
| 26 | 6 | 125–130 |
| Second Segment | | |
| 27 | 6 | 0–5 |
| 28 | 6 | 6–11 |
| 29 | 6 | 12–17 |
| 30 | 6 | 18–23 |
| 31 | 6 | 24–29 |
| 32 | 7 | 30–36 |
| 33 | 7 | 36–43 |
| 34 | 7 | 44–50 |
| 35 | 7 | 51–57 |
| 36 | 7 | 58–64 |
| 37 | 7 | 65–71 |
| 38 | 7 | 72–78 |
| 39 | 7 | 79–85 |
| 40 | 7 | 86–92 |
| 41 | 7 | 93–99 |
| 42 | 7 | 100–106 |
| 43 | 7 | 107–113 |
| 44 | 7 | 114–120 |
| 45 | 7 | 121–127 |
| 46 | 7 | 128–134 |
| Third Segment | | |
| 47 | 7 | 0–6 |
| 48 | 7 | 7–13 |

-continued

| Slot | No. of Bits | Bit Nos. |
| --- | --- | --- |
| 49 | 7 | 14–20 |
| 50 | 7 | 21–27 |
| 51 | 7 | 28–34 |
| 52 | 7 | 35–41 |
| 53 | 7 | 42–48 |
| 54 | 7 | 49–55 |
| 55 | 7 | 56–62 |
| 56 | 7 | 63–69 |
| 57 | 7 | 70–76 |
| 58 | 7 | 77–83 |
| 59 | 7 | 84–90 |
| 60 | 7 | 91–97 |
| 61 | 7 | 98–104 |
| 62 | 7 | 105–111 |
| 63 | 7 | 112–118 |

Each level-1 group is represented in memory by three 144-bit segments (data bits augmented by error-control bits). Because the contents of each level-1 group is compressed, each segment represents a different number of level-1 entries. The first segment represents entries 0 through 26, the second segment represents entries 27 through 46, and the third represents entries 47 through 63. Each level-2 group is represented in memory by sixteen 144-bit segments. Level-2 segments are not compressed. Thus, each level-2 segment represents eight level-2 slots.

All changes to level-1 cache lines are filtered through a level-1 input buffer. To load a level-1 cache line, the microcontroller 23 first loads each of the three level-1 segments comprising a group into the level-1 input buffer and then transfers the contents of the input buffer into the appropriate cache slot. Changes to the level-2 cache lines are made in a similar fashion. The microcontroller accomplishes these tasks by performing the following operations (EC in the material that follows stands for error controller 27):

RESET-LEVEL-1-INPUT-BUFFER—Resets all entries in the level-1 input buffer to zero (the object space manager unit 31 maintains a record of which level-1 segments in the buffer have been modified since the most recent RESET operation by accompanying each entry with a "dirty" bit-this operation clears all of the "dirty" bits);

RESET-LEVEL-2-INPUT-BUFFER - Resets all entries in the level-2 input buffer to zero (the object space manager unit 31 maintains a record of which level-2 segments in the buffer have been modified since the most recent RESET operation by accompanying each entry with a "dirty" bit-this operation clears all of the "dirty" bits);

LOAD-LEVEL-1-INPUT-BUFFER-FROM-EC(segment no.)—Copies and unpacks 135 error-corrected data bits into the specified segment of the level-1 input buffer;

LOAD-LEVEL-2-INPUT-BUFFER-FROM-EC(segment no.)—Copies and unpacks 135 error-corrected data bits into the specified segment of the level-2 input buffer;

COPY-LEVEL-1-INPUT-BUFFER(slot no.)—Copies the level-1 input buffer to the specified level-1 cache line (only the entries that have been modified since the input buffer was most recently reset will be copied to the destination cache line);

COPY-LEVEL-2-INPUT-BUFFER(slot no.)—Copies the level-2 input buffer to the specified level-2 cache line (only the entries that have been modified since the input buffer was most recently reset will be copied to the destination cache line).

When objects are installed into the database of the object space manager unit 31, the object space manager unit must overwrite each entry in a particular subrange of a particular level-1 group with the offset within that group at which the new object begins. To accomplish this task, the microcontroller performs the following operations:

UPDATE-LEVEL-1-INPUT-BUFFER(value,low index, high index)—Writes "value" to every entry of the level-1 input buffer having an index in the range from "low index" to "high index" and for each entry so updated, sets the "dirty" bit;

UPDATE-LEVEL-2-INPUT-BUFFER(value,low index, high index)—Writes "value" to every entry of the level-2 input buffer having an index in the range from "low index" to "high index" and for each entry so updated, sets the "dirty" bit;

Normally, the microcontroller 23 will first reset the input buffer, then update the desired subrange, and then copy the input buffer to the appropriate cache slot.

Since all of the level-3 codes reside permanently within the object space manager unit 31, level-3 data is updated directly by performing the following operation:

UPDATE-LEVEL-3(value,low index, high index)— Writes "value" to every entry of level 3 having an index in the range from "low index" to "high index".

Lookup operations are performed directly on the appropriate cache line:

LOOKUP-LEVEL-1(slot no.,index)—Returns the value stored at the specified index in the specified slot of the level-1 cache;

LOOKUP-LEVEL-2(slot no.,index)—Returns the value stored at the specified index in the specified slot of the level-2 cache;

LOOKUP-LEVEL-3(index)—Returns the value stored at the specified index of the level-3 group.

After modifying a particular cache line, the microcontroller 23 must write the modified contents back to memory. The following two operations allow the microcontroller to copy one segment of any level-1 or level-2 cache line to an output buffer in the error controller 27:

STORE-LEVEL-1-TO-OUTPUT-BUFFER(slot no., segment no.)—Copies the specified segment of the specified slot of the level-1 cache to the output buffer;

STORE-LEVEL-2-TO-OUTPUT-BUFFER(slot no., segment no.)—Copies the specified segment of the specified slot of the level-2 cache to the output buffer.

On the clock cycle following the clock cycle for either of the above operations, the 135 data bits accompanied by 9 error-control bits can be copied from the error controller to the memory controller 13.

Some operations of the object space manager unit 31, such as the UPDATE operations, are likely to require multiple machine cycles to complete. The following command allows the microcontroller 23 to examine the object space manager unit's status and fetch results from prior commands (OSM stands for object space manager unit 31):

CHECK-OSM-STATUS—Returns a code that represents the object space manager unit's current status with respect to previously-issued operation commands.

The error controller 27 is of the same basic design as error controller 17. The error controller 27 serves as a buffer for information transfer between the memory controller 13 and the object space manager unit 31. Under direction from the microcontroller 23, the memory controller reads or writes 144-bit error-control blocks to and from a latch within the error controller 27. The object space manager unit, under the direction of the microcontroller, reads 135-bit blocks of error-corrected data from and writes 135-bit blocks of raw data to this same latch.

The microcontroller 23 avoids copying the contents of the error controller 27 latch to memory 6 during the same cycle that the contents of the latch are being modified by the object space manager unit 31, because the error controller needs one machine cycle to recompute the error correcting codes following an update.

The system memory 6 utilizes the "RAMBUS" memory architecture. "RAMBUS" memory is designed to provide high throughput at low cost. "RAMBUS" memory cells, called "RDRAM's", transfer one 9-bit byte every 2 ns, but incur a startup cost on each memory transaction. The sense amplifiers of each "RDRAM" serve as a small on-chip cache (2 kbyte cache on 512-kbyte "RDRAM"). If a memory fetch hits the cache, the first byte is available in 50 ns; if the fetch misses the cache, the first byte comes out after 154 ns. For writes, the corresponding times are 18 ns and 122 ns respectively.

Another benefit of the "RAMBUS" architecture is that it supports a small amount of concurrent processing within different "RDRAM" chips. To mitigate the latency associated with "RDRAM" cache misses, a memory transaction that misses the cache of a particular "RDRAM" causes the "RDRAM" to fetch the appropriate information into the device's cache while simultaneously sending a negative acknowledgment to the "RAMBUS" master. The "RAMBUS" master is free to initiate a transaction with a different "RDRAM" module while waiting for the original "RDRAM" to finish fetching the requested memory into its cache.

Further information concerning the "RAMBUS" architecture is available from Rambus Inc. who are located in Mountain View, Calif.

What is claimed is:

1. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered;

an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code.

2. The apparatus of claim 1 wherein:

a request by the CPU to fetch data from the memory at a specified address causes the arbiter to simultaneously perform a first operation and a second operation, the first operation being the immediate retrieval from the memory of the data at the specified address and the delivery thereof to the CPU, the second operation being the examination of the specified address and the data retrieved from the memory, the second operation including retracting the delivered data by sending a "retry fetch" signal to the CPU if the examination reveals an error in the data or a conflict with an intermediate garbage-collecting state.

3. The garbage-collecting memory apparatus of claim 2 wherein the arbiter comprises:

a memory controller for fetching data from and writing data into the memory, the memory controller receiving CPU requests to fetch data directly from the CPU and returning the fetched data directly to the CPU, the memory controller receiving CPU requests to write data via the arbiter, the memory controller holding the write data in a buffer memory having a capacity of holding a predetermined number of write requests, the memory controller executing write requests stored in the write buffer memory in the order of receipt, the memory controller giving highest priority to the execution of fetch requests.

4. The garbage-collecting memory apparatus of claim 3 wherein the memory controller includes a prefetch-hint first-in/first-out buffer memory and a prefetch-hint cache, a prefetch hint being an anticipated future fetch request by the CPU, the memory controller fetching data from memory at the prefetch-hint address first out of the prefetch-hint buffer memory, the memory controller storing the prefetch-hint data in the prefetch-hint cache, the arbiter further comprising:

a microcontroller for controlling the operations within the arbiter, the microcontroller determining prefetch hints by monitoring memory transactions, the microcontroller supplying prefetch hints to the memory controller for entry into the prefetch-hint buffer memory.

5. The garbage-collecting memory apparatus of claim 4 wherein the microcontroller determines that the memory block N+1 is a prefetch hint when a recent memory fetch was the memory block N, a memory block being a unit of data that is stored or retrieved from memory in one memory operation, the order of the memory blocks in memory being the order of the integers, N being an integer that identifies a particular memory block.

6. The garbage-collecting memory apparatus of claim 4 wherein the microcontroller determines that the memory block N+(k+1)c is a prefetch hint when recent memory fetches were the memory blocks N, N+c, . . . ,N+kc, a memory block being a unit of data that is stored or retrieved from memory in one memory operation, the order of the memory blocks in memory being the order of the integers, N being an integer that identifies a particular memory block, k being either a positive or negative integer, c being a positive integer.

7. The garbage-collecting memory apparatus of claim 4 wherein the microcontroller determines that the memory block M is a prefetch hint when a recent memory fetch was the memory block N and memory block N contained a pointer to memory block M, a memory block being a unit of data that is stored or retrieved from memory in one memory operation, the order of the memory blocks in memory being the order of the integers, N and M being integers that identify particular memory blocks.

8. The garbage-collecting memory apparatus of claim 4 wherein the microcontroller determines prefetch hints in a plurality of ways and maintains a history of the effectiveness of the different ways in determining prefetch hints that correctly anticipate future memory fetch requests by the CPU, the microcontroller prioritizing its use of the plurality of ways in accordance with the history of effectiveness of the different ways.

9. The garbage-collecting memory apparatus of claim 3 wherein the memory controller immediately returns the fetched data to the CPU and the arbiter further comprises:

a fetch monitor which monitors CPU fetch requests and memory controller responses and, if the data returned to the CPU by the memory controller is invalid, advises the CPU to retry the fetch request.

10. The garbage-collecting memory apparatus of claim 9 wherein the arbiter further comprises:

a microcontroller for controlling the operations within the arbiter, the microcontroller, upon a retry of a fetch request by the CPU, causes the requested data to be returned to the CPU.

11. The garbage-collecting memory apparatus of claim 10 wherein the arbiter further comprises:

a communication-channels unit that acts as a buffer between the CPU and the microcontroller, messages sent by the CPU to the microcontroller being stored in a message buffer memory in the communication-channels unit, the messages being retrieved by the microcontroller from the message buffer memory in the order of arrival, the microcontroller, upon a retry of a fetch request by the CPU, returns the requested data to the CPU via the communication-channels unit.

12. The garbage-collecting memory apparatus of claim 11 wherein the arbiter further comprises:

a first error controller for adding error-control bits to one or more data words in one or more data groups, each data word being a member of at least one error-control group, each error-control group including error-control bits, the error-control groups containing the same data word being nested if the number of error-control groups is greater than one, each error-control group comprising at least one data word, one or more nested error-control groups constituting a parcel of data that can be written to or fetched from memory in response to a write request or a fetch request respectively, the first error controller also detecting the existence of bit errors in an error-control group up to a first predetermined maximum number and correcting all bit errors in a group up to a second predetermined maximum number, the first predetermined maximum number being equal to or greater than one, the second predetermined maximum number being equal to or greater than zero, one or more nested error-control groups being supplied to the first error controller by the memory controller with a command to either (1) detect and correct errors or (2) recompute the error-control bits after modification of a data word by the microcontroller.

13. The garbage-collecting memory apparatus of claim 12 wherein:

the communication-channels unit includes a write buffer memory, write requests from the CPU being stored in the write buffer memory;

the microcontroller responds to a CPU write request in the write buffer memory of the communication-channels unit by requesting that the memory controller copy the error-control group at the write address in memory to the first error controller;

the microcontroller writes the CPU-requested words to the write address in the error-control group held by the first error controller;

the first error controller recomputes the error-control bits for the error-control group it is holding;

the memory controller writes the error-control group that is being held by the first error controller back into memory.

14. The garbage-collecting memory apparatus of claim 3 wherein the arbiter further comprises:

a fetch monitor which monitors CPU fetch requests and memory controller responses and (1) if the fetched data is valid, enables the memory controller to return the fetched data to the CPU and (2) if the fetched data is invalid, blocks the memory controller from returning the fetched data to the CPU and causes the arbiter to reexecute the fetch request.

15. The garbage-collecting memory apparatus of claim 9 wherein the arbiter further comprises:

a microcontroller for controlling the operations within the arbiter, the microcontroller causing the fetch request to be reexecuted if the fetched data is invalid.

16. The garbage-collecting memory apparatus of claim 15 wherein the arbiter further comprises:

a communication-channels unit that acts as a buffer between the CPU and the microcontroller, messages sent by the CPU to the microcontroller being stored in a message buffer memory in the communication-channels unit, the messages being retrieved by the microcontroller from the message buffer memory in the order of arrival, the microcontroller returning the data retrieved from memory as a result of a reexecuted data fetch to the CPU via the communication-channels unit.

17. The garbage-collecting memory apparatus of claim 2 wherein the arbiter comprises:

a microcontroller for controlling the operations within the arbiter;

a communication-channels unit that acts as a buffer between the CPU and the microcontroller, messages sent by the CPU to the microcontroller being stored in a message buffer memory in the communication-channels unit, the messages being retrieved by the microcontroller from the message buffer memory in the order of arrival;

a memory controller for fetching data from and writing data into the memory, the memory controller receiving requests to fetch and write data from the microcontroller, the memory controller holding the write data in a buffer memory having a capacity of holding a predetermined number of write requests, the memory controller executing write requests stored in the write buffer memory in the order of receipt, the memory controller giving highest priority to the execution of fetch requests;

an object space manager unit which acts as an intermediary between the microcontroller and the memory controller in creating an object of a specified size at a specified beginning address in the memory in response to a request from the CPU, the microcontroller in concert with the object space manager unit and the memory controller causing a header-location code to be derived and stored in header-space for each address occupied by the specified object, the object space manager unit in concert with the memory controller causing a header-location code to be fetched from header-space in response to a request from the microcontroller.

18. The garbage-collecting memory apparatus of claim 17 wherein:

the memory controller copies a header-location code group from the memory to the object space manager unit in response to a request by the microcontroller, a header-location code group comprising a plurality of header-location codes;

the object space manager unit makes changes in the header-location codes contained in the header-location code group as specified by the microcontroller;

the microcontroller copies the header-location code group from the object space manager unit to the memory controller;

the memory controller writes the header-location code group into the memory in response to a request by the microcontroller.

19. The garbage-collecting memory apparatus of claim 17 wherein:

the memory controller copies a header-location code group from the memory to the object space manager unit in response to a request by the microcontroller, a header-location code group comprising a plurality of header-location codes;

the object space manager unit returns to the microcontroller a header-location code from the header-location code group as specified by the microcontroller.

20. The garbage-collecting memory apparatus of claim 17 wherein the arbiter further comprises:

a second error controller for adding error-control bits to a header-location code group to form an error-control group, a header-location code group comprising a plurality of header-location codes, an error-control group constituting the parcel of data that is written to or fetched from memory in response to a write request or a fetch request respectively, the second error controller also detecting the existence of bit errors in an error-control group up to a first predetermined maximum number and correcting all bit errors in a group up to a second predetermined maximum number, the first predetermined maximum number being equal to or greater than one, the second predetermined maximum number being equal to or greater than zero.

21. The garbage-collecting memory apparatus of claim 20 wherein:

the memory controller copies an error-control group from the memory to the second error controller upon request of the microcontroller;

the second error controller detects errors in the error-control group up to the first predetermined maximum number and corrects errors up to the second predetermined maximum number;

the object space manager unit retrieves the header-location code group from the second error controller upon request of the microcontroller.

22. The garbage-collecting memory apparatus of claim 20 wherein:

the object space manager unit copies a header-location code group to the second error controller upon request of the microcontroller;

the second error controller adds error-control bits to the header-location code group to form the error-control group;

the memory controller copies the error-control group from the second error controller to the memory upon request of the microcontroller.

23. The garbage-collecting memory apparatus of claim 20 wherein:

the memory controller copies an error-control group from the memory to the second error controller upon request of the microcontroller;

the second error controller detects errors in the error-control group up to the first predetermined maximum number and corrects errors up to the second predetermined maximum number;

the object space manager unit retrieves the header-location code group from the second error controller upon request of the microcontroller;

the object space manager unit makes changes in the header-location codes contained in the header-location code group as specified by the microcontroller;

the object space manager unit copies a header-location code group to the second error controller upon request of the microcontroller;

the second error controller adds error-control bits to the header-location code group to form the error-control group;

the memory controller copies the error-control group from the second error controller to the memory upon request of the microcontroller.

24. The garbage-collecting memory apparatus of claim 20 wherein:

the memory controller copies an error-control group from the memory to the second error controller upon request of the microcontroller;

the second error controller detects errors in the error-control group up to the first predetermined maximum number and corrects errors up to the second predetermined maximum number;

the object space manager unit retrieves the header-location code group from the second error controller upon request of the microcontroller;

the object space manager unit returns to the microcontroller a header-location code from the header-location code group as specified by the microcontroller.

25. The apparatus of claim 2 wherein:

the memory has subspaces designated as from-space and to-space, each subspace having a plurality of locations for storing words, each location having a unique address, the addresses in each subspace being ordered, two addresses in to-space being designated as Relocated and Reserved;

the arbiter, upon receiving a request from the CPU to fetch data from the memory at a specified address, retracts the delivered data by sending a "relay fetch" signal to the CPU if the specified address lies between Relocated and Reserved, determines the address of the header of the object containing the specified address and fetches the requested data from from-space, the header of the object in to-space providing a pointer to the header of the object in from-space.

26. The apparatus of claim 25 wherein:

the memory has a subspace designated as mark-and-sweep-space and each word in memory contains a bit that identifies the word as being a pointer or a non-pointer, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects;

the arbiter, if the requested data is a pointer that does not point to to-space, determines the address of the header of the object to which the requested data points and, if the link field of the object contains a non-address, a non-address being a word that is not an address in the memory, adds the object to the marked-object list.

27. The apparatus of claim 25 wherein:

the arbiter, upon a retry of the fetch request by the CPU, makes available to the CPU the requested data that was fetched from from-space.

28. The apparatus of claim 25 wherein each word in memory contains a bit that identifies the word as being a pointer or a non-pointer, and the arbiter, if the requested data is a pointer to a from-space object, determines the address of the header of the from-space object and (1) if the header contains a pointer to the header of the object in a location reserved for the object in to-space, changes the requested data to a to-space pointer, or (2) if the header does not contain a pointer to the header of the object in a location reserved for the object in to-space, designates a reserved space in to-space for the from-space object, adds the from-space object to a copy queue, the copy queue being a list of objects in from space to be copied to reserved spaces in to-space, derives and stores a header-location code in header-space for each address in to-space reserved for the from-space object, copies the header of the from-space object to its reserved to-space location, places a pointer in the to-space header pointing to the object's location in from-space, places a pointer in the from-space header pointing to the object's reserved location in to-space, and translates the requested data into a to-space pointer.

29. The garbage-collecting memory apparatus of claim 25 wherein:

each data word stored in the memory is a member of at least one error-control group, each error-control group including error-control bits, the error-control groups containing the same data word being nested if the number of error-control groups is greater than one, each error-control group comprising at least one data word, one or more nested error-control groups constituting a parcel of data that can be written to and fetched from memory at one time;

the arbiter detects the existence of bit errors in an error-control group fetched from the memory up to a first predetermined maximum number and corrects all bit errors in a group fetched from the memory up to a second predetermined maximum number, the first predetermined maximum number being equal to or greater than one, the second predetermined maximum number being equal to or greater than zero.

30. The garbage-collecting memory apparatus of claim 29 wherein:

the arbiter (1) fetches the data from the specified address in memory and returns the fetched data to the CPU and (2) if errors are detected in the fetched data, advises the CPU that the returned data is invalid and that the CPU should retry the fetch request.

31. The garbage-collecting memory apparatus of claim 30 wherein:

the arbiter, upon a retry of the fetch request by the CPU, makes available to the CPU the requested data after correction of errors in the group containing the requested data provided the number of errors is not greater than the second predetermined maximum number.

32. The garbage-collecting memory apparatus of claim 29 wherein:

the arbiter fetches the data from the specified address in memory and (1) if no errors are detected in the fetched data, returns the fetched data to the CPU and (2) if errors are detected in the fetched data, makes available to the CPU the requested data after correction of errors in the group containing the requested data provided the number of errors is not greater than the second predetermined maximum number.

33. The garbage-collecting memory apparatus of claim 29 wherein data specified by the CPU to be fetched from or written to the memory is called CPU-request data and is comprised of at least one word, the number of words in the CPU-request data being less than or equal to the number of words in the smallest error-control word group.

34. The garbage-collecting memory apparatus of claim 29 wherein the arbiter first detects the existence of errors in a group provided the number of errors is not greater than the first predetermined maximum and, if the existence of errors in the group is detected, then corrects the errors if the number of errors is not greater than the second predetermined maximum.

35. The garbage-collecting memory apparatus of claim 34 wherein:

the arbiter (1) fetches the data from the specified address in memory and returns the fetched data to the CPU and (2) if errors are detected in the fetched data, advises the CPU that the returned data is invalid and that the CPU should retry the fetch request.

36. The garbage-collecting memory apparatus of claim 35 wherein:

the arbiter, upon a retry of the fetch request by the CPU, makes available to the CPU the requested data after correction of errors in the group containing the requested data provided the number of errors is not greater than the second predetermined maximum number.

37. The garbage-collecting memory apparatus of claim 34 wherein:

the arbiter fetches the data from the specified address in memory and (1) if no errors are detected in the fetched data, returns the fetched data to the CPU and (2) if errors are detected in the fetched data, makes available to the CPU the requested data after correction of errors in the group containing the requested data provided the number of errors is not greater than the second predetermined maximum number.

38. The apparatus of claim 2 wherein:

the memory has a subspace designated as mark-and-sweep-space and each word in memory contains a bit that identifies the word as being a pointer or a non-pointer, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects;

the arbiter, upon receiving a request from the CPU to fetch data from the mark-and-sweep-space at a specified address, determines the address of the header of the object to which the requested data points and, if the link field of the object contains a non-address, a non-address being a word that is not an address in the memory, adds the object to the marked-object list.

39. The apparatus of claim 2 wherein:

the memory has subspaces designated as from-space and to-space, each subspace having a plurality of locations for storing words, each location having a unique address, the addresses in each subspace being ordered;

the arbiter, upon receiving a request from the CPU to fetch data from the memory at a specified address, retracts the delivered data by sending a "retry fetch" signal to the CPU if the retrieved data is from from-space and represents a pointer to from-space.

40. The apparatus of claim 39 wherein:

the arbiter, if the retrieved data is from from-space and represents a pointer to from-space, tends the pointer and, in response to a "fetch retry" by the CPU, makes available to the CPU the tended pointer.

41. The apparatus of claim 2 wherein:

the memory has subspaces designated as from-space and to-space, each subspace having a plurality of locations for storing words, each location having a unique address, the addresses in each subspace being ordered, each word in memory containing a bit that identifies the word as being a pointer or a non-pointer;

the arbiter, upon receiving a request from the CPU to fetch data from the memory at a specified address and the requested data is a pointer to from-space object, determines the address of the header of the from-space object and (1) if the header contains a pointer to the header of the object in a location reserved for the object in to-space, changes the requested data to a to-space pointer, or (2) if the header does not contain a pointer to the header of the object in a location reserved for the object in to-space, designates a reserved space in to-space for the from-space object, adds the from-space object to a copy queue, the copy queue being a list of objects in from-space to be copied to reserved spaces in to-space, derives and stores a header-location code in header-space for each address in to-space reserved for the from-space object, copies the header of the from-space object to its reserved to-space location, places a pointer in the to-space header pointing to the object's location in from-space, places a pointer in the from-space header pointing to the object's reserved location in to-space, and translates the requested data into a to-space pointer.

42. The garbage-collecting memory apparatus of claim 2 wherein:

the memory has subspaces designated as from-space and to-space, each subspace having a plurality of locations for storing words, each location having a unique address, the addresses in each subspace being ordered, two addresses in to-space being designated as Relocated and Reserved;

each data word stored in the memory is a member of at least one error-control group, each error-control group including error-control bits, the error-control groups containing the same data word being nested if the number of error-control groups is greater than one, each error-control group comprising at least one data word and constituting a parcel of data that can be written to and fetched from memory at one time;

the arbiter detects the existence of bit errors in a group fetched from the memory up to a first predetermined maximum number and corrects all bit errors in a group fetched from the memory up to a second predetermined maximum number, the first predetermined maximum number being equal to or greater than one, the second predetermined maximum number being equal to or greater than zero;

the arbiter, responding to a request from the CPU to write specified data into the memory at a specified address, (1) if the specified address lies between Relocated and Reserved, determines the address of the header of the object containing the specified address, the header of the object in to-space providing a pointer to the header of the object in from-space, fetches the error-control groups having addresses that include the from-space address that corresponds to the specified address in to-space, detects and corrects any errors in the error-control groups, inserts the specified data into the error-control groups, recomputes the error-control bits that are included in the error-control groups, and writes the error-control groups back into from-space, or (2) if the specified address does not lie between Relocated and Reserved, fetches the error-control groups having addresses that include the specified address, inserts the specified data into the error-control groups, recomputes the error-control bits, and writes the error-control groups back into to-space.

43. The garbage-collecting memory apparatus of claim 2 wherein:

each word in memory contains a bit that identifies the word as being a pointer or a non-pointer, each object stored in memory has a link field in a predetermined location relative to the object header, an unmarked object being one where the link field contains a non-address, a non-address being a word that is not an address in the memory, a marked object being one where the link field contains a pointer to the next marked object on a marked-object list that is comprised of the header addresses of all marked objects;

the arbiter, upon receiving a request from the CPU to fetch data from memory at a specified address, (1) returns the requested data to the CPU, (2) if the requested data is a pointer to another object, determines the address of the header of the other object, and (3) if the other object is an unmarked object, adds the header address of the other object to the marked-object list.

44. The garbage-collecting memory apparatus of claim 43 wherein:

the arbiter, upon receiving a request from the CPU for the header address for the next object on the marked-object list, returns the requested header address, the next object being the object following the last object on the marked-object list requested by the CPU.

45. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having subspaces designated as from-space and to-space, each subspace having a plurality of locations for storing words, each location having a unique address, the addresses in each subspace being ordered, two addresses in to-space being designated as Relocated and Reserved, the memory having a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects, two addresses in mark-and-sweep-space being designated as MSRelocated and MSReserved;

an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code, the arbiter, upon receiving a request from the CPU to fetch data from the memory at a specified address, (1) if the specified address lies between Relocated and Reserved or between MSRelocated and MSReserved, determining the address of the header of the object containing the specified address and fetches the requested data from from-space, the header of the object in to-space or mark-and-sweep-space providing a pointer to the header of the object in from-space, or (2) if the specified address does not lie between Relocated and Reserved or between MSRelocated and MSReserved, fetching the requested data from the memory at the specified address.

46. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having subspaces designated as from-space and to-space, each subspace having a plurality of locations for storing words, each location having a unique address, the addresses in from-space and to-space being ordered, each word in memory containing a bit that identifies the word as being a pointer or a non-pointer, a copy count being maintained in the header of each object of the number of times the object has been copied from from-space to to-space, the memory having a subspace designated as mark-and-sweep-space, the mark-and-sweep-space having a plurality of locations for storing words, each location having a unique address, the addresses in mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects;

an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code, the arbiter, upon receiving a request from the CPU to fetch data from the memory at a specified address and the requested data is a pointer to a from-space object, determining the address of the header of the from-space object and (1) if the header contains a pointer to the header of the object in a location reserved for the object in to-space, changing the requested data to a to-space pointer, or (2) if the header does not contain a pointer to the header of the object in a location reserved for the object in to-space and if the copy count equals or exceeds a predetermined number, designating a reserved space in mark-and-sweep-space for the from-space object, adding the from-space object to a mark-and-space copy queue, the mark-and-space copy queue being a list of objects in from-space to be copied to reserved spaces in mark-and-sweep-space, deriving and storing a header-location code in header-space for each address in mark-and-sweep-space reserved for the from-space object, copying the header of the from-space object to its reserved mark-and-sweep-space location, placing a pointer in the mark-and-sweep-space header pointing to the object's location in from-space, placing a pointer in the from-space header pointing to the object's reserved location in mark-and-sweep-space, and translating the requested data into a mark-and-sweep-space pointer or (3) if the header does not contain a pointer to the header of the object in a location reserved for the object in to-space and if the copy count does not equal or exceed a predetermined number, reserving space in to-space for the from-space object, adding the from-space object to a copy queue, the copy queue being a list of objects in from-space to be copied to reserved spaces in to-space, deriving and storing a header-location code in header-space for each address in to-space reserved for the from-space object, copying the header of the from-space object to its reserved to-space location, placing a pointer in the to-space header pointing to the object's location in from-space, placing a pointer in the from-space header pointing to the object's reserved location in to-space, and translating the requested data into a to-space pointer.

47. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having subspaces designated as from-space and to-space, each subspace having a plurality of locations for storing words, each location having a unique address, the addresses in each subspace being ordered, two addresses in to-space being designated as Relocated and Reserved, the memory having a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects, two addresses in mark-and-sweep-space being designated as MSRelocated and MSReserved;

an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code, the arbiter, upon receiving a request from the CPU to write specified data into the memory at a specified address, (1) if the specified address lies between Relocated and Reserved or between MSRelocated and MSReserved, determining the address of the header of the object containing the specified address and writing the specified data into from-space or mark-and-sweep-space respectively, the header of the object in to-space providing a pointer to the header of the object in from-space or mark-and-sweep-space respectively, or (2) if the specified address does not lie between Relocated and Reserved or between MSRelocated and MSReserved, writing the specified data to the specified address.

48. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects;

an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code, the arbiter, upon receiving a request from the CPU to fetch data from the mark-and-sweep-space at a specified address, determining the address of the header of the object to which the requested data points and, if the link field of the object contains a non-address, adding the object to the marked-object list.

49. An apparatus for use with a central processing unit (CPU) comprising:

a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having subspaces designated as from-space and to-space, each subspace having a plurality of locations for storing words, each location having a unique address, the addresses in each subspace being ordered, garbage collection in the from-space and to-space regions being accomplished by incrementally copying live objects out of from-space and into to-space, the memory having a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects;

the arbiter, if the requested data is a pointer that does not point to either from-space or to-space, determines the address of the header of the object to which the requested data points and, if the link field of the object contains a non-address, adds the object to the marked-object list.

50. An apparatus for use with a central processing unit (CPU) comprising:

a memory having subspaces designated as from-space and to-space;

an arbiter, upon receiving a request from the CPU to fetch data from the memory at a specified address, (1) fetches the data from the specified address in memory and returns the fetched data to the CPU and (2) if the data at the specified address is a pointer to from-space, advises the CPU that the returned data is invalid and that the CPU should retry the fetch request.

51. The apparatus of claim 50 wherein:

the arbiter fetches the data from the specified address in memory and if the data at the specified address is a pointer to from-space, returns the requested data to the CPU after translation into a to-space pointer.

52. The apparatus of claim 50 wherein:
the arbiter, upon a retry of the fetch request by the CPU, makes available to the CPU the requested data after translation into a to-space pointer.

53. An apparatus for use with a central processing unit (CPU) comprising:
a memory for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the memory having subspaces designated as from-space and to-space, each subspace having a plurality of locations for storing words, each location having a unique address, the addresses in each subspace being ordered, two addresses in to-space being designated as Relocated and Reserved;
an arbiter having a means of communication with the CPU and a means for writing data into and reading data out of the memory, a request by the CPU to create a specified object of a specified size at a specified beginning address in the memory causing the arbiter to perform an action, the specified object having a header address, there being a plurality of addresses to be occupied by the specified object, the action being to derive and store a header-location code in header-space for each address to be occupied by the specified object, the header address of the object being derivable from the header-location code, the arbiter, upon receiving a request from the CPU to write specified data into the memory at a specified address, (1) if the specified address lies between Relocated and Reserved, determining the address of the header of the object containing the specified address and writing the specified data into from-space, the header of the object in to-space providing a pointer to the header of the object in from-space, or (2) if the specified address does not lie between Relocated and Reserved, writing the specified data to the specified address.

54. The apparatus of claim 53 wherein the memory has a subspace designated as mark-and-sweep-space, the mark-and-sweep-space having a plurality of locations for storing words, each location having a unique address, the addresses in the mark-and-sweep-space being ordered, the specified address being in either to-space or mark-and-sweep-space.

55. A method for operating a memory under the direction of a central processing unit (CPU), the memory being used for storing words and objects, an object comprising a plurality of words that share a particular attribute and occupy a contiguous region of memory, each object having a header that specifies the type and size of an object, the memory having a subspace designated as header-space, header-space having a plurality of locations for storing words, each location having a unique address, the addresses in header-space being ordered, the CPU having requested that an object of a specified size at a specified beginning address in the memory be created, the method comprising the steps:
deriving a header-location code for each address occupied by the specified object, the header address of the object being derivable from the header-location code;
writing the header-location codes into header-space.

56. The method of claim 55 wherein the CPU having requested that data fetched from the memory at a specified address, the method further comprising the step:
performing a first operation and a second operation, the first operation being the immediate retrieval from the memory of the data at the specified address and the delivery thereof to the CPU, the second operation being the examination of the specified address and the data retrieved from the memory, the second operation including retracting the delivered data by sending a "retry fetch" signal to the CPU if the examination reveals an error in the data or a conflict with an intermediate garbage-collecting state.

57. The method of claim 56 wherein the memory has subspaces designated as from-space and to-space, each subspace having a plurality of locations for storing words, each location having a unique address, the addresses in each subspace being ordered, two addresses in to-space being designated as Relocated and Reserved, the CPU having requested that data be fetched from a specified address in memory, the method further comprising the steps:
if the specified address lies between Relocated and Reserved, determining the address of the header of the object containing the specified address and fetching the requested data from from-space, the header of the object in to-space providing a pointer to the header of the object in from-space;
if the specified address does not lie between Relocated and Reserved, fetching the requested data from the memory at the specified address.

58. The method of claim 57 wherein the memory has a subspace designated as mark-and-sweep-space and each word in memory contains a bit that identifies the word as being a pointer or a non-pointer, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects, the method further comprising the steps:
if the requested data is a pointer that does not point to to-space, determining the address of the header of the object to which the requested data points;
if the link field of the object contains a non-address, adding the object to the marked-object list.

59. The method of claim 57 further comprising the steps:
fetching the data from the specified address in memory and returning the fetched data to the CPU;
if the specified address lies between Relocated and Reserved, advising the CPU that the returned data is invalid and that the CPU should retry the fetch request.

60. The method of claim 59 wherein a retry of the fetch request is made by the CPU, the method further comprising the step:
returning to the CPU the requested data that was fetched from from-space.

61. Apparatus for practicing the method of claim 60.

62. The method of claim 57 further comprising the steps:
fetching the data from the specified address in memory;
if the specified address does not lie between Relocated and Reserved, returning the fetched data to the CPU;

if the specified address does lie between Relocated and Reserved, returning to the CPU the requested data that was fetched from from-space.

63. The method of claim 57 wherein each word in memory contains a bit that identifies the word as being a pointer or a non-pointer, the method further comprising the steps:

if the requested data is a pointer to a from-space object, determining the address of the header of the from-space object and (1) if the header contains a pointer to the header of the object in a location reserved for the object in to-space, changing the requested data to a to-space pointer, or (2) if the header does not contain a pointer to the header of the object in a location reserved for the object in to-space, designating a reserved space in to-space for the from-space object, adding the from-space object to the copy queue, the copy queue being a list of objects in from-space to be copied to reserved spaces in to-space, deriving and storing a header-location code in header-space for each address in to-space reserved for the from-space object, copying the header of the from-space object to its reserved to-space location, placing a pointer in the to-space header pointing to the object's location in from-space, placing a pointer in the from-space header pointing to the object's reserved location in to-space, and translating the requested data into a to-space pointer.

64. The method of claim 63 wherein the memory has a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects, the method further comprising the steps:

if the requested data is a pointer that does not point to either from-space or to-space, determining the address of the header of the object to which the requested data points;

if the link field of the object contains a non-address, adding the object to the marked-object list.

65. Apparatus for practicing the method of claim 64.

66. The method of claim 63 further comprising the steps: fetching the data from the specified address in memory and returning the fetched data to the CPU;

if the data at the specified address is a pointer to from-space, advising the CPU that the returned data is invalid and that the CPU should retry the fetch request.

67. The method of claim 66 wherein a retry of the fetch request is made by the CPU, the method further comprising the step:

returning to the CPU the requested data after translation into a to-space pointer.

68. Apparatus for practicing the method of claim 67.

69. The method of claim 63 further comprising the steps: fetching the data from the specified address in memory;

if the data at the specified address is not a pointer to from-space, returning the fetched data to the CPU;

if the data at the specified address is a pointer to from-space, returning to the CPU the requested data after translation into a to-space pointer.

70. Apparatus for practicing the method of claim 63.

71. The method of claim 57 wherein each data word stored in the memory is a member of at least one error-control group, each error-control group including error-control bits, the error-control groups containing the same data word being nested if the number of error-control groups is greater than one, each error-control group comprising at least one data word, one or more nested error-control groups constituting a parcel of data that can be written to and fetched from memory at one time, the method further comprising the step:

detecting the existence of bit errors in an error-control group fetched from the memory up to a first predetermined maximum number and correcting all bit errors in a group fetched from the memory up to a second predetermined maximum number, the first predetermined maximum number being equal to or greater than one, the second predetermined maximum number being equal to or greater than zero.

72. The method of claim 71 further comprising the steps: fetching the data from the specified address in memory and returning the fetched data to the CPU;

if errors are detected in the fetched data, advising the CPU that the returned data is invalid and that the CPU should retry the fetch request.

73. The method of claim 72 wherein a retry of the fetch request is made by the CPU, the method further comprising the step:

returning to the CPU the requested data after correction of errors in the group containing the requested data provided the number of errors is not greater than the second predetermined maximum number.

74. The method of claim 71 further comprising the steps: fetching the data from the specified address in memory;

if no errors are detected in the fetched data, returning the fetched data to the CPU;

if errors are detected in the fetched data, returning to the CPU the requested data after correction of errors in the group containing the requested data provided the number of errors is not greater than the second predetermined maximum number.

75. The method of claim 71 wherein data specified by the CPU to be fetched from or written to the memory is called CPU-request data and is comprised of at least one word, the number of words in the CPU-request data being less than or equal to the number of words in the smallest error-control word group.

76. The method of claim 75 wherein the memory has subspaces designated as from-space and to-space, each subspace having a plurality of locations for storing words, each location having a unique address, the addresses in each subspace being ordered, two addresses in to-space being designated as Relocated and Reserved, the CPU having requested that specified data be written into the memory at a specified address, the method further comprising:

if the specified address lies between Relocated and Reserved, determining the address of the header of the object containing the specified address and writing the specified data into from-space, the header of the object in to-space providing a pointer to the header of the object in from-space;

if the specified address does not lie between Relocated and Reserved, writing the specified data to the specified address.

77. The method of claim 71 wherein the detecting step comprises the steps:

detecting the existence of errors in a group provided the number of errors is not greater than the first predetermined maximum;

if the existence of errors in the group is detected, correcting the errors if the number of errors is not greater than the second predetermined maximum.

78. The method of claim 77 further comprising the steps:

fetching the data from the specified address in memory and returning the fetched data to the CPU;

if errors are detected in the fetched data, advising the CPU that the returned data is invalid and that the CPU should retry the fetch request.

79. The method of claim 78 wherein a retry of the fetch request is made by the CPU, the method further comprising the step:

returning to the CPU the requested data after correction of errors in the group containing the requested data provided the number of errors is not greater than the second predetermined maximum number.

80. The method of claim 77 further comprising the steps:

fetching the data from the specified address in memory;

if no errors are detected in the fetched data, returning the fetched data to the CPU;

if errors are detected in the fetched data, returning to the CPU the requested data after correction of errors in the group containing the requested data provided the number of errors is not greater than the second predetermined maximum number.

81. Apparatus for practicing the method of claim 57.

82. The method of claim 56 wherein the memory has subspaces designated as from-space, to-space, and mark-and-sweep-space, each subspace having a plurality of locations for storing words, each location having a unique address, the addresses in each subspace being ordered, two addresses in to-space being designated as Relocated and Reserved, two addresses in mark-and-sweep-space being designated as MSRelocated and MSReserved, the CPU having requested that data be fetched from a specified address in memory, the method further comprising the steps:

if the specified address lies between Relocated and Reserved or between MSRelocated and MSReserved, determining the address of the header of the object containing the specified address and fetching the requested data from from-space, the header of the object in to-space or mark-and-sweep-space providing a pointer to the header of the object in from-space;

if the specified address does not lie between Relocated and Reserved or between MSRelocated and MSReserved, fetching the requested data from the memory at the specified address.

83. The method of claim 56 wherein the memory has subspaces designated as from-space and to-space, each subspace having a plurality of locations for storing words, each location having a unique address, the addresses in each subspace being ordered, two addresses in to-space being designated as Relocated and Reserved, the CPU having requested that specified data be written into memory at a specified address, the method further comprising the steps:

if the specified address lies between Relocated and Reserved, determining the address of the header of the object containing the specified address and writing the specified data into from-space, the header of the object in to-space providing a pointer to the header of the object in from-space;

if the specified address does not lie between Relocated and Reserved, writing the specified data to the specified address.

84. The method of claim 83 wherein the memory has a subspace designated as mark-and-sweep-space, the mark-and-sweep-space having a plurality of locations for storing words, each location having a unique address, the addresses in the mark-and-sweep-space being ordered, the specified address being in either to-space or mark-and-sweep-space.

85. Apparatus for practicing the method of claim 84.

86. Apparatus for practicing the method of claim 83.

87. The method of claim 56 wherein the memory has subspaces designated as from-space, to-space, and mark-and-sweep-space, each subspace having a plurality of locations for storing words, each location having a unique address, the addresses in each subspace being ordered, two addresses in to-space being designated as Relocated and Reserved, two addresses in mark-and-sweep-space being designated as MSRelocated and MSReserved, the CPU having requested that specified data be written into memory at a specified address, the method further comprising the steps:

if the specified address lies between Relocated and Reserved or between MSRelocated and MSReserved, determining the address of the header of the object containing the specified address and writing the specified data into from-space, the header of the object in to-space or mark-and-sweep-space providing a pointer to the header of the object in from-space;

if the specified address does not lie between Relocated and Reserved or between MSRelocated and MSReserved, writing the specified data to the specified address.

88. The method of claim 56 wherein the memory has subspaces designated as from-space and to-space, each subspace having a plurality of locations for storing words, each location having a unique address, the addresses in each subspace being ordered, two addresses in to-space being designated as Relocated and Reserved, each data word stored in the memory being a member of at least one error-control group, each error-control group including error-control bits, the error-control groups containing the same data word being nested if the number of error-control groups is greater than one, each error-control group comprising at least one data word and constituting a parcel of data that can be written to and fetched from memory at one time, the method further comprising the steps:

detecting the existence of bit errors in a group fetched from the memory up to a first predetermined maximum number and correcting all bit errors in a group fetched from the memory up to a second predetermined maximum number, the first predetermined maximum number being equal to or greater than one, the second predetermined maximum number being equal to or greater than zero.

89. The method of claim 88, the CPU having requested that specified data be written into the memory at a specified address, the method further comprising the steps:

if the specified address lies between Relocated and Reserved, determining the address of the header of the object containing the specified address, the header of the object in to-space providing a pointer to the header of the object in from-space, fetching the error-control groups having addresses that include the from-space address that corresponds to the specified address in to-space, detecting and correcting any errors in the error-control groups, inserting the specified data into the error-control groups, recomputing the error-control bits that are included in the error-control groups, and writing the error-control groups back into from-space;

if the specified address does not lie between Relocated and Reserved, fetching the error-control groups having addresses that include the specified address, inserting the specified data into the error-control groups, recomputing the error-control bits, and writing the error-control groups back into to-space.

90. The method of claim 56 wherein each word in memory contains a bit that identifies the word as being a pointer or a non-pointer, each object stored in memory has a link field in a predetermined location relative to the object header, an unmarked object being one where the link field contains a non-address, a non-address being a word that is not an address in the memory, a marked object being one where the link field contains a pointer to the next marked object on a marked-object list that is comprised of the header addresses of all marked objects, the CPU having requested that data at a specified address in the memory be fetched, the method further comprising the steps:

returning the requested data to the CPU;

if the requested data is a pointer to another object, determining the address of the header of the other object;

if the other object is an unmarked object, adding the header address of the other object to the marked-object list.

91. The method of claim 90, the CPU having requested the header address for the next object on the marked-object list, the method further comprising the step:

returning the requested header address, the next object being the object following the last object on the marked-object list requested by the CPU.

92. Apparatus for practicing the method of claim 91.

93. Apparatus for practicing the method of claim 90.

94. The method of claim 56 wherein the memory has subspaces designated as from-space and to-space, each subspace having a plurality of locations for storing words, each location having a unique address, the addresses in each subspace being ordered, each word in memory containing a bit that identifies the word as being a pointer or a non-pointer, the CPU having requested that data at a specified address in memory be fetched, the method further comprising the steps;

if the requested data is a pointer to a from-space object, determining the address of the header of the from-space object;

if the header contains a pointer to the header of the object in a location reserved for the object in to-space, changing the requested data to a to-space pointer;

if the header does not contain a pointer to the header of the object in a location reserved for the object in to-space, designating a reserved space in to-space for the from-space object, adding the from-space object to the copy queue, the copy queue being a list of objects in from-space to be copied to reserved spaces in to-space, deriving and writing a header-location code into header-space for each address in to-space reserved for the from-space object, copying the header of the from-space object to its reserved to-space location, placing a pointer in the to-space header pointing to the object's location in from space, placing a pointer in the from-space header pointing to the object's reserved location in to-space, and translating the requested data into a to-space pointer.

95. The method of claim 94 wherein the memory has a subspace designated as mark-and-sweep-space, the mark-and-sweep-space having a plurality of locations for storing words, each location having a unique address, the addresses in the mark-and-sweep-space being ordered, each object stored in mark-and-sweep-space having a link field in a predetermined location relative to the object header, an unmarked object being one where the link field contains a non-address, a non-address being a word that is not an address in the memory, a marked object being one where the link field contains a pointer to the next marked object on a marked-object list that contains all marked objects, the method further comprising the steps:

if the requested data is a pointer that does not point to either from-space or to-space, determining the address of the header of the object to which the requested data points;

if the link field of the object contains a non-address, adding the object to the marked-object list.

96. Apparatus for practicing the method of claim 95.

97. Apparatus for practicing the method of claim 94.

98. Apparatus for practicing the method of claim 56.

* * * * *